US008423406B2

(12) United States Patent
Briggs

(10) Patent No.: US 8,423,406 B2
(45) Date of Patent: Apr. 16, 2013

(54) DETERMINING ADVERTISING EFFECTIVENESS WITH ONLINE REACH AND FREQUENCY MEASUREMENT

(75) Inventor: Jason Rex Briggs, El Dorado Hills, CA (US)

(73) Assignee: Marketing Evolution, El Dorado Hills, CA (US)

( * ) Notice: Subject to any disclaimer, the term of this patent is extended or adjusted under 35 U.S.C. 154(b) by 144 days.

(21) Appl. No.: 13/113,814

(22) Filed: May 23, 2011

(65) Prior Publication Data

US 2011/0313814 A1  Dec. 22, 2011

Related U.S. Application Data

(63) Continuation of application No. 11/209,469, filed on Aug. 22, 2005, now Pat. No. 7,949,561.

(60) Provisional application No. 60/603,188, filed on Aug. 20, 2004.

(51) Int. Cl.
*G06Q 30/00* (2006.01)
(52) U.S. Cl.
USPC .................................. 705/14.41; 705/14.42
(58) Field of Classification Search ............... 705/14.41, 705/14.42
See application file for complete search history.

(56) References Cited

U.S. PATENT DOCUMENTS

| 7,949,561 | B2 | 5/2011 | Briggs |
| 2003/0074252 | A1* | 4/2003 | Chandler-Pepelnjak et al. ............................ 705/10 |
| 2011/0320260 | A1 | 12/2011 | Briggs |

OTHER PUBLICATIONS

Coffey, S. and Mazumdar, M., "The reach and frequency approach to advertising planning on the Internet", 2002, downloaded Nov. 13, 2012 from http://www.websm.org/db/12/490/rec/.*
Dialog document: Zufryden, Fred S., Journal of Advertising Research , v 40 , n 6 , p. 65, Nov. 2000.*
Dravillas, Jim, et al., Cross-Media and the Web: Best Practices for Using the Internet to Measure Cross-Media Advertising Campaigns, Paper presented at the ARF Week of Workshops, Sep. 24, 2003, NYC.
Briggs, Rex, "Cross-Media Measurement", downloaded Aug. 12, 2010 from http://www.marketingevolution.com/.
Iab, "New Cross Media Optimization Studies (XMOS)", press release dated Feb. 10, 2003, downloaded Aug. 12, 2010 from http://www.iab.net.
U.S. Patent and Trademark Office, "Notice of Allowance" for U.S. Appl. No. 13/113,807 mailed Jul. 24, 2012.

* cited by examiner

*Primary Examiner* — Donald L Champagne
(74) *Attorney, Agent, or Firm* — Meyertons, Hood, Kivlin, Kowert & Goetzel, P.C.; Eric B. Meyertons

(57) ABSTRACT

A method converts online data into quantitative measures of reach and frequency. Gross Rating Points, Targeted Rating Points, frequency, targeted cost per thousand, and average advertising cost per person may be determined using data to measure the percent of non-country respondents receiving and gathering incidence of age, sex, income and other variables used to define target audience. Data may be merged to calculate GRP delivery by geographic region for the purpose of integrating online advertising into a marketing mix analysis. Over-samples may be used within events to measure different respondents' pre and post the event to measure incrementality of event. The total event attendance may be estimated and used to weight the over-sample back into the overall sample. Discrete media groupings may be used to identify the dilution of effects inherent in scaling thereby increasing the accuracy of projected results.

31 Claims, 22 Drawing Sheets

DETERMINING ADVERTISING EFFECTIVENESS WITH ONLINE REACH AND FREQUENCY MEASUREMENT

RELATED APPLICATIONS

This application is a continuation of U.S. patent application Ser. No. 11/209,469 entitled "Method for Determining Advertising Effectiveness" filed on Aug. 22, 2005, now U.S. Pat. No. 7,949,561 which claims priority to U.S. Provisional Patent Application No. 60/603,188, filed Aug. 20, 2004, entitled "Method for Determining Advertising Effectiveness", the disclosures of which are both incorporated herein by reference in their entirety.

BACKGROUND OF THE INVENTION

1. Field of the Invention

The invention relates to methods of advertising analysis; more specifically, the invention relates to methods for determining the effectiveness of at least one medium of advertising, particularly in a multi-media or cross-media advertising campaign. The inventive method is used in part to determine one medium's effectiveness isolated from the effects of other media.

2. Description of the Related Art

Marketers face an increasingly challenging advertising environment. Media channels continue to fragment, and audiences are elusive. The imperative to reach consumers with a consistent message across multiple points of contact comes in the midst of advertising/marketing budget cuts and intense competition. These challenges occur while an emerging medium, the Internet, has attracted advertising dollars from major marketers. A series of industry studies have proven that the web has branding as well as direct response value.

The advent of integrated, cross-media campaigns that include the Internet has spurred marketers to explore how different media can be used synergistically to build their brands. And while branding objectives may be unified across media, the understanding that media have inherent differences, and costs, has led marketers to try to build competitive advantage by honing the efficiency of their cross-media investments. Many methodologies for measuring the impact of various marketing components fall short in measuring online advertising, so new methodologies, which take advantage of digital ad delivery and more cost-efficient data collection techniques, have come to the fore.

This new kind of research, which began with the present invention, relies primarily on experimental design to arrive at the findings related to relative media effectiveness and cost-efficiency, and Secondarily the research relies on the electronic real time ad delivery tracking and survey data for opportunity-to-see (OTS) to develop a more refined direction for implementing the re-allocation. Other approaches to cross-media measurement look similar in reporting and data collection to the inventive method but derive their findings from a different approach for combining electronic tracking and survey data for OTS measurement and/or the implementation of exposed/not exposed pseudo experimental designs. These other approaches of Cross Media Measurement (CMM) and Internet Cross-Media Measurement (ICM), bring with them some key challenges in ensuring proper analysis and interpretation of results.

Many of the techniques that marketers employ to measure their marketing mix do not work well for measuring the Internet and digital components of most cross-media campaigns. Over the past several decades, various methodologies have been developed and employed to measure the effectiveness of different marketing platforms within an integrated campaign. When measuring offline marketing channels only, these methodologies can be valuable in determining the overall relative efficiency of the efforts. However, many of these methodologies were developed before the advent of digital marketing and were not designed to quantify the Internet's (or other digital media's) contribution. In many cases, inherent aspects of those methodologies render them inadequate in measuring digital marketing activity.

While each of the following existing methodologies have been employed in limited cases to measure the value of digital marketing alone or as components of integrated strategies, they do not currently appear to be viable techniques for measuring the vast majority of online advertising or integrated marketing campaigns.

Some of those methodologies include:

Media Mix Modeling

Media mix modeling analyzes the efficiency of marketing activity by correlating data such as attitudes and sales with marketing spending and promotional activity. Since online marketing spending is generally a very small proportion of marketing budgets, these methodologies usually cannot accurately measure the Internet's contribution to the media mix unless Online Advertising spending is substantially increased. This typically would cost a marketer several million dollars in online advertising spending to reach the suggested threshold of reach. Modeling is also very expensive and cost-prohibitive to measure individual campaigns.

Tracking

Using telephone, mail or Internet based tracking for day-after-recall of advertising and general brand tracking is common, but it has drawbacks when online advertising is in the mix. The most significant drawback is the difficulty in using Random Digit Dial (RDD) methods to locate exposed respondents to online campaigns, which generally do not achieve high national reach. Another problem relates to the fact that online advertising is served in rotation; different visitors to the same web pages may be exposed to different advertisements. Thus, when it comes to the web, gauging vehicle exposure through surveys cannot effectively determine advertising exposure in most cases.

Split (or Matched) Market Testing

This methodology is perhaps the most promising as it does not require multi-million dollar national spending inherent in the media mix model approach, and is considered a gold-standard in measuring such media as radio. This approach works by measuring the effect of marketing activity in a test market and compares sales results to a matched market in which there is no marketing activity. In concept, this approach is highly defensible, but in practice this methodology cannot effectively be employed with online advertising because geo-targeting on the Internet is not yet sufficient to saturate a specific market with online advertising and block advertising from a matched region. Nor is this approach integrated with cross-media analysis. It is designed as a stand alone analysis of a single media.

Typical CMM & ICM uses "as it falls" sampling. ICM leverages the ability to track exposure to online advertising (with electronic "cookies"), but does not segment audience into exposed/control groups and cost-efficiently sample respondents to overcome some of the challenges described above. Two ads are randomly served with two separate cookies. After the survey is completed, respondents are analyzed in terms of the cookie, which is either "exposed" or "not exposed". This may result in significant error for several reasons to be explained below.

Internet technology allows the research to precisely establish and determine control and exposed groups relative to online advertisements. Internet recruitment can also be extremely cost-effective, with little marginal cost (except respondent incentives) in recruiting large samples.

Utilizing digital media such as the Internet for recruitment creates a number of issues and challenges. When attempting to use an online surveying technique to gauge overall media-mix brand effectiveness, a fundamental concern is how accurately web surveys capture an audience that reflects a normal distribution of online and offline media behavior. Since the Internet is not yet ubiquitous, the potential exists for the results of the online surveys to be biased towards the specific proclivities of the Internet universe. The demographics of the Internet universe and the non-Internet universe reveal that the two populations are not equal. The Internet universe remains younger, more affluent, and higher educated. With that in mind, it is certainly conceivable that the online and offline groups of people will view media in different patterns and will respond to media in different ways. Thus, using an Internet-based sample to project cross-media effects to the entire US could encounter some error.

A potential concern is that Internet and non-Internet universes may differ in media consumption of television, print, radio and other offline media. In general, heavier Internet users tend to be lighter television viewers than non-Internet users. Further, a study by IMS and Doubleclick confirmed this notion by showing that targeting advertising toward heavier Internet users fills in the gaps that offline advertising leaves among the lightest offline viewers. In their study, delivering Internet advertising especially to heavier Internet users added disproportionate GRPs to the lightest offline quintiles.

FIG. 9 illustrates the specific difficulty in using the basic ICM online study universe to represent total US media usage patterns. The chart represents the television delivery of an actual packaged-goods advertiser's schedule. In this example, the television schedule delivers 455 GRPs to the total US Female 25-49 target. However, when the GRPs are decomposed against the Internet and non-Internet universes, it becomes clear that the two groups have received unequal media weight; the online population received 28% fewer GRPs than the offline population (420 GRPs vs. 537 GRPs). As a result of the disparate media weights, the online and offline segments of the Female 25-49 target could likely have received differential branding impact from the television schedule. In this example, interviewing survey respondents from the online universe in a basic ICM study may not have given a representative view of the overall TV impact.

Collecting online samples that mirror US media consumption is further complicated by another feature of online recruiting: the heaviest online users are the most likely to be invited to participate in the research. It has already been shown that the heaviest online users have the greatest skew towards light television viewing. Since these heavy Internet users typically comprise the greatest portion of the online sample in a basic ICM study, the potential to get a non-representative view of total offline media behavior becomes enlarged. Also, since heavy Internet users tend to be light television viewers, the net impact of the heavy user bias in recruitment is that online surveys will tend to over-sample the lightest television viewers and may result in an underestimation of the impact of TV ad campaigns. Of course, if the heaviest TV quintile is receiving 16 TV ads in 30 days, by undersampling these heavier TV users, ICM type studies could also make TV look more efficient than it really is by under-reporting those that have been over-delivered.

It has been demonstrated in public forums how conducting surveys within the average online ad schedule would tend to attract the heaviest online users if using the methods of CCM and ICM. Based on the page consumption patterns of a real site, the simulation distributed page views to users in five quintiles. Simulated ad schedules were then created that represented varying Shares of Voice (SOV), or portions of the total pages served. At typically low SOV levels for online recruitment of 3% to 10%, the simulation (FIG. 10) showed that the heaviest Internet users had a dramatically higher likelihood of being asked to participate compared to the lighter Internet users. Over 60% of the potential sample come from the top two quintiles, while fewer than 20% come from the bottom two quintiles. It is not until one achieves very high SOVs that the percentage of possible survey participants flattens out across the quintile groups.

This lopsidedness among the quintiles presents specific difficulties for extrapolating cross-media effects from an online sample and may also pose problems to the basic design of Online advertising effectiveness studies that use a simple "exposed/not exposed" research design instead of a true experimental design.

As online advertising became a larger component of advertising dollars there was a clear need for advertisers to integrate online impressions into their Marketing Mix Models. In order for a specific media to be isolated accurately in a multi linear regression marketing mix model the media weight variable for each media should be input into the model at the most granular level possible, however online is not currently bought and sold in the same way that other media is. Most other media is input to the model as Gross Rating Points (or Targeted Ratings Points) by Market (DMA) by week. The multi linear regression then looks for relationships between the media delivery and changes in sales volume to determine how much each media is driving sales. Online advertising is not currently bought or monitored in the same currency as other media. Advertisers and marketing mix modeling companies have attempted to use different variables for Online to include it into the marketing mix model but this can cause the relative comparison of online advertising to other media to be inaccurate.

Some of the inaccurate methods which have been used to integrate online into Marketing Mix Models are 1) using national impression inputs 2) clicks on ads 3) Consumer Panel Projections and 4) Ad server regional reporting.

Using national impression inputs will produce an inaccurate picture of online advertising because online is generally a smaller reach media which may not be measurable due to the error factor in the Marketing Mix Model. The Marketing Mix Model becomes more accurate with more variability and when the online media weight stream is limited to only national weekly information rather than weekly information broken down by market the chances for accurate measurement become slim.

Using clicks on an online ad as the input for the Marketing Mix Model misses major parts of the online advertising media weight and it not a similar currency to the other media being used in the model. This would be similar to the practice of only including telephone calls produced by a magazine ad as the input for magazine media weight into the marketing mix model which is generally not the data stream used for Marketing Mix Modeling.

Consumer Panel projections for the weekly GRP or TRP by market is only as reliable as the panel is down to the market by market level. Often times Consumer Panels are validated against the National Census population demographics which is valuable for some research. In the case of the weekly GRP reporting by market the reliability of the panel between markets is critical to the accuracy of the Marketing Mix Model output. If the panel is not representative at the individual market level these differences will result in different GRP levels reported where there really was differences. See FIG. 17 for comparisons of Consumer Panel data to the survey data collected directly from the campaign. The Consumer Panel also does not adjust the projections for the impressions that are delivered outside of the United States. The Consumer Panel projected to the national level may include impressions delivered outside of the US.

Because of the infrastructure of the Internet some companies have tried to leverage the third party ad servers as a source for the weekly GRP information. The third party ad serving tool hosts or holds the creative file for an advertiser then each publisher or website sources the file from the third party ad server. When the virtual request is made from the website to the third party ad server to deliver a particular ad the ad server can read the IP address of the server making the request for the ad. This IP address can then be associate with the zip where the Internet Service Provider is located. Again because of the infrastructure of the Internet, the consumer using the computer may be connecting through an Internet Service Provider that is in a different city. This can again cause problems because the media weight is being delivered into a different market than is being reported by the third party ad server.

All of the previously explained methodologies produce Online advertising inputs for the Marketing Mix Model which face one or both of these problems: 1) inaccurately grouping impressions into regions, and 2) providing inadequate or inappropriate data on which to model Online advertising.

A number of other problems exist in conventional ICM methods. ICM methods simply put contaminated respondents in the exposed group. This leads to measurement error. ICM methods also fail to measure the decay of Online advertising; worse, these methods can bias analysis toward Online by surveying consumers right after exposure.

Further, ICM methods typically fail to properly account for frequency of ad exposure. Frequency of ad exposure is a key determinant in brand metrics. Empirical research has shown that the absorption is convex linear, meaning that at a certain point, diminishing returns limit the incremental value of additional advertising impression. For ICM research, a vital prerequisite to the budget reallocation projection is the ability to accurately capture advertising frequency for individual media, in order to observe effects at varying levels of exposure. Some ICM research uses ad frequency estimates as the cornerstone for projecting Internet advertising effects at higher Internet spend (and therefore higher frequency) levels. Conversely, this reallocation of dollars to the web is counterbalanced by reduced offline spend, resulting in lower offline ad frequency. And, estimates of the relationship between offline frequencies and ad effectiveness are incorporated into the offline projections at the reduced spend levels. However, in ICM research, there are differences in the way frequency is estimated for each medium. In this type of research, Internet and print frequency estimates are more precise than estimates of TV frequency, and this may impact the ability to accurately tie frequency estimates with advertising effectiveness measures analyzing online frequency require matching those exposed to those delivered control ads by frequency. Otherwise, one is mistaking heavier usage of the media with advertising effect. The old approach used by CCM and ICM mismatches frequency because those in the not exposed group systematically have lighter frequency than the exposed group. This is a consequence of not using a true exposed/control design and a consequence of not measuring frequency properly.

Proper measurement analyzes advertising effect analyzes one variable (such as frequency) while holding other factors such as the size of the ads and the context of delivery constant. The old approach simply analyzes each variable (such as frequency) in a bi-variate fashion and does not simultaneously analyze or control for other collinear factors.

Issues arise in other specific media as well. In TV measurement, the ICM approach uses the Online campaign sample as representative TV sample. However, since heavier online users are lighter TV users, sampling an online campaign, which by nature will skew toward heavier users, will bias the sample and result in an understatement of TV's impact and shared interpretation of TV's diminishing returns. Also, in an attempt to account for non-online populations, the ICM approach may use telephone and online, but does not integrate the two data sets. Also, measuring TV without accounting for the reach curve in TV can dramatically underestimate TV's effect and bias the analysis in favor of online. The ICM approach makes no adjustment for TV's reach.

The ICM approach also attempts to guess which respondents have been exposed to TV advertising, but has no way of cross-checking this assignment. Analyzing TV requires measurement beyond simple "pre" and "post" summaries. The ICM approach only measures pre-post branding gains. But for some campaigns, TV's effect is to maintain high branding levels, therefore proper analysis of TV considers the maintenance effect of TV, not just the "pre-post" build.

Concerning competitive effects, ICM does not consider or calculate the effects of competitive advertising on the measured brand. As for attitudinal/branding and sales effects, ICM measured just attitudinal/branding. but not both attitudinal/branding and sales. Further, the conventional Media Mix Modeling approach, which measures the impact of offline advertising and marketing on sales fails to accurately measure Online advertising because the Media Mix Models have used online impressions or click through to put online into the marketing mix model, even though all other media are measured in terms of gross rating points (GRPs) or targeted rating points (TRPs). There has been no method for converting Online advertising campaign impressions into GRPs by specific geographic region, which is the necessary format for Marketing Mix Models.

In terms of online media presence in media mix models, ICM measured television on a pre-post basis only, and, in one case, it plotted diminishing returns by quintile. When attempting to measure sales in a test market, Marketing Mix Models uses matching cities, or geographies for matching markets, or an exposed and not exposed as it falls design as mentioned above (in the case of A C Nielsen). Each approach is either not feasible for Online advertising or is less accurate than the invention.

Another main drawback to conventional ICM methods lay in their inability to break down the individual effects of subcomponents of the ad buy within a medium; they were only able to report the aggregated effect of each medium and not report the contribution of individual ads and placements in an accurate manner.

The prior art also had significant shortfalls in connection with measuring the reach of print advertising as well. In determining magazine readers versus non-readers, the conventional approach examines magazine readers based on a survey question and then analyzes readers against everyone else. In determining exposed versus control readers and pre-post for same magazine/newspaper, and in taking controlled circulation measurements, the conventional approach simply compared pre-post magazine newspaper effects.

Generally, the prior art also used GRPs, reach, and frequency for optimization, had no way of measuring events, as significant error may result under such methodologies.

Accordingly, there is a long-felt need to create a marketing measuring method that overcomes the above deficiencies. More specifically, there is a long-felt need to assess the complementary effects of cross-media campaigns. There is a long-felt need to dissect the results of a branding campaign to understand the individual contribution of each medium. There is also a long-felt need to measure the cost efficiency of different media for key marketing objectives.

SUMMARY OF THE INVENTION

The invention is a method for determining advertising effectiveness, especially in cross-media campaigns. There are six basic steps to the inventive method: a) effectiveness of the combined campaign is plotted; b) the effects of different media are isolated; c) complementary effects and synergies are examined; d) a dollar-for-dollar comparison (Return on Marketing Objective, or "ROMO" calculation) is performed for each of the media; e) budget re-allocations are recommended, if applicable; and f) post effectiveness, efficiency, and allocation analysis is performed, specifically by providing descriptive advertising and media suggestions on each media independently. Step f) is preferred but optional.

Preferably, the inventive method utilizes online ad serving technology to produce two identical "matched" markets. These "virtual matched markets" are in fact an experimental design with identical "exposed" and "control" cells. To measure additional media, the inventive method expands the design to a factorial experimental design—meaning multiple media combinations are simultaneously isolated and measured. The inventive method also unites this factorial experimental design with continuous tracking.

More specifically, rather than using the traditional exposed/not exposed approach, the inventive method uses true experimental design. Segments of exposed and control respondents are pre-assigned based on the media plan prior to the start of measurement. Pre-assignment of respondents to control and exposed segments is followed by ad exposure (or control exposure), and then branding and/or sales measurement is taken to gauge effect. Multiple media effects are measured through placing each additional media to be measured in an orthogonal fashion to online (this is a factorial design). It is modified for television, when television can not be purchased in a geo-targeted fashion by using pre-post data summary (thus making pre the control group and post being the exposed group within the factorial experimental design).

Not everything in a media campaign can be isolated. Static sponsorships and such create universal coverage among those visiting the page. This can lead to contamination of exposed or control cells. In decontaminating exposed or control cells, the inventive method preferably applies a special analysis to identify contaminated respondents, remove them, then re-weight the cells to ensure match between exposed and control groups. The difference in effect with and without consensual respondents may be analyzed as a synergistic effect.

With the inventive method, the decay rate is preferably directly measured and applied to the analysis to make it a level playing field for all media. The invention applies a time based ID to the ad delivery and the survey completion. This time based ID is used to measure the time since last exposure. By using a random sampling survey or panel which is not tied to the online ad campaign, the average time since last exposure can be measured and applied to the whole sample to properly account for decay.

Analyzing online frequency requires matching those exposed to those not delivered control ads. Otherwise, one may mistake heavier usage of the media with advertising effect. The inventive method preferably insures that the exposed and the control groups have the same media usage levels and ad exposure levels. If the groups are not matched, a data weighting procedure is applied.

Unlike the traditional bi-variate analysis of variables, the inventive method preferably applies a multi-variate analysis procedure to factor out (or hold constant) other factors such as frequency, ad size, time of day, recency, website context, and so forth so that the interactions of these variables can be accurately measured.

It has been shown that heavier online users are lighter TV users, therefore sampling an online campaign, which by nature will skew toward heavier users will therefore bias the sample. But if one takes a representative sample of the Internet, it indexes to nearly a perfect fit to TV usage. The inventive method uses a representative online sample, based on either 1) frequency capped recruitment of web-wide panel recruitment or 2) representative or projectable national probability panel 3) multi-modal survey sample (web and in-person, telephone or direct mail).

The inventive method preferably integrates online and telephone samples, direct mail, or in-person surveys to account for those not online. The same core survey is used across all modes of surveying, then the samples are integrated based on weighting online and offline users in proportion to the incidence observed in the total population survey.

The inventive method creates a more accurate mechanism for converting online impressions into useable data for marketing mix models. The inventive method overcomes the previously stated problems in the data by combining Consumer Panel Data, Ad server data, and Direct Campaign Surveys.

The inventive method is a process that is straightforward in execution and will capture the most accurate information about online impression delivery to provide the best inputs for the Marketing Mix Model. This level of accuracy is critical to ensure the application of the model results are based on sound research techniques.

As mentioned above, measuring TV without accounting for the reach curve in TV can dramatically underestimate TV's effect and bias the analysis by underestimating TV's impact. The inventive method preferably uses the TV ratings reach number as the denominator and the point difference (subtracting out the effects of other media) between the pre-TV campaign and post-TV campaign as the numerator. The result is the reach adjusted TV effect. In other words, the method uses the overall TV effect divided by TV reach to calculate the overall effect of TV. This TV effect number can then be used to cross-check any assignment of those into exposed or not exposed by TV effects in Step 6, descriptive analysis. Without the accurate reach adjusted TV effect number, no confidence in TV exposed and not exposed level assignments. Other measurement approaches do not account for reach adjusted effect and therefore underestimate TV's effect.

Beyond simple pre- and post-campaign measurements, the inventive method trends TV effects over the entire campaign and fits regression curves to capture TV's underlying effect when it reports "pre-post". The Old approach takes a short-cut by simply looking at the beginning and the end of the TV campaign and therefore may distort TV's true effect. Further-more, if the measurement entails multiple flights, a separate pre and post (based on regression) for each flight is produced. Further, the inventive method explicitly analyzes TV for the maintenance effect by examining the drop in branding levels when the brand is not supported by advertising. The maintenance effect of advertising is therefore the point difference between the branding level when advertising compared to the drop when advertising is not running.

Concerning competitive advertising, the inventive method preferably measures the effects of competitive spending and response to branding to factor in competitive activity in the model. And while traditional approaches measure either sales or branding effects but never both, the inventive method preferably links sales and branding effects in one analysis of advertising effectiveness. It does so by using experimental design to identify incremental sales and incremental branding effect across media. The sales incrementality of online advertising can be analyzed within a factorial experimental design to identify the cross media effects, or it can be integrated into a marketing mix analysis as a "test market". In accordance with the inventive method, ad tagging, surveys, and a standing panel of online users are preferably utilized to convert online impressions into GRPs by geographic region.

In marketing mix models that include online advertisement, the inventive method integrates local spot buy matching markets, thereby creating a pre-post/control-exposed analysis design for isolating incremental impact of specific aspects of TV advertising effectiveness. Further, in determining diminishing returns, instead of plotting by quintile, the inventive method plots diminishing return by deciles, and also uses the average frequency per day as a cross-check. The final calibration is made by aligning the average effect observed over the course of the study with a convex linear diminishing returns curve by frequency.

The inventive method outstrips prior methods in measuring sales in a test market. The inventive method uses a known buying population (e.g., a sales panel, a frequent shopping database, or a buyers list) and randomly divides it into exposed and control groups. The population is linked with an online ad server, and advertising is delivered accordingly based on assignment to exposed and control groups. Results are measured after the fact. The inventive method has for capturing sales effect:

1) Exposed/Control design matched sample
2) Specific targeting known

Preferably, the inventive method includes a post-hoc measurement for sales. It preferably uses a large online campaign and holds out a control group. The control group receives control advertising, and their subsequent sales are measured to establish a baseline sales level. The exposed group is also measured, and the incremental sales above and beyond the control group are reported as the impact of the advertising. The identification of exposed and control respondents and linkage to sales can occur in a panel, or by invitation to receive an email or after a known purchase to take a survey.

It is important to be cognizant of the individual effects of sub-components of an ad buy within a given medium. The inventive method preferably not only reports the aggregated effects of each medium, but breaks down the sub-components such as the effects of different ad sizes (TV commercials of varying lengths, magazine page size, online ad size, etc.) and different media properties (different programming channels, magazine titles, etc.). In each medium, it preferably uses branding or sales data merged with exposure data for the media. For television, the inventive method uses survey probability data and/or set-top box data; for online, it uses ad server data; for magazine, it uses the survey data using magazine covers, for radio the use of a portable people meter (also applicable to TV); and for newspaper, it uses zip code data and self-reported survey data.

The inventive method has relevancy in measuring print ad measurement as well as online ad measurement. In parsing magazine readers from non-readers, the method uses magazine cover images and classifies each cover as containing an ad for the brand or not containing an ad for the brand. Respondents are divided into three groups based on their response to the survey: (1) readers exposed to the ad, (2) readers not exposed to the ad, and (3) non-readers. Groups 1 & 2 are compared by matching frequency, survey completion date and profile, and weighting the two groups in the analysis to match one another. In addressing exposed against control readers and pre-post for the same periodical, the inventive method preferably compares pre and post as trending the branding effects overtime among (1) readers exposed, (2) readers not exposed and (3) non-readers. It weights the readers exposed and readers not exposed among key variables, including mean date for survey completion. For Controlled circulation magazines or newspapers, a survey is mailed or emailed to respondents prior to the campaign start and again during the campaign. Where possible, the magazine or newspapers assigns different subscribers to exposed on control groups. This creates a pre-post/control-exposed design for additional precision on the impact of magazine or newspapers. This approach also applies to direct mail and email lists.

Generally speaking, the inventive method offers several advantageous, preferred features. It uses brand metrics such as brand awareness, positive brand imagery, purchase intention and sales as the basis for media plan optimization. It converts online data into GRP, TRP, reach, frequency, targeted cost per thousand, and average advertising cost per person by using survey data to measure the percent of non-country respondents receiving survey and gathering incidence of age, sex, income and other variables used to define target audience. It also merges survey data with panel data to calculate GRP delivery by geographic region for the purpose of integrating Online advertising into a Marketing Mix analysis. Preferably, the method uses over-samples within events to measure different respondents pre and post the event to measure incrementality of event. The total event attendance is then estimated, and used to weight the oversample back into the overall sample. The method also preferably uses discrete media groupings to identify the dilution of effects inherent in scaling reach, thereby increasing the accuracy of projected results.

BRIEF DESCRIPTION OF THE DRAWINGS

FIGS. 5A-1 and 5A-2 are graphs showing experimental design converted to continuous tracking reporting of an overall campaign effect in accordance with the invention. which shows how different combinations of the experimental design cells can be used to derive population based effects, in accordance with the invention.

DETAILED DESCRIPTION OF THE INVENTION

Figure 1:
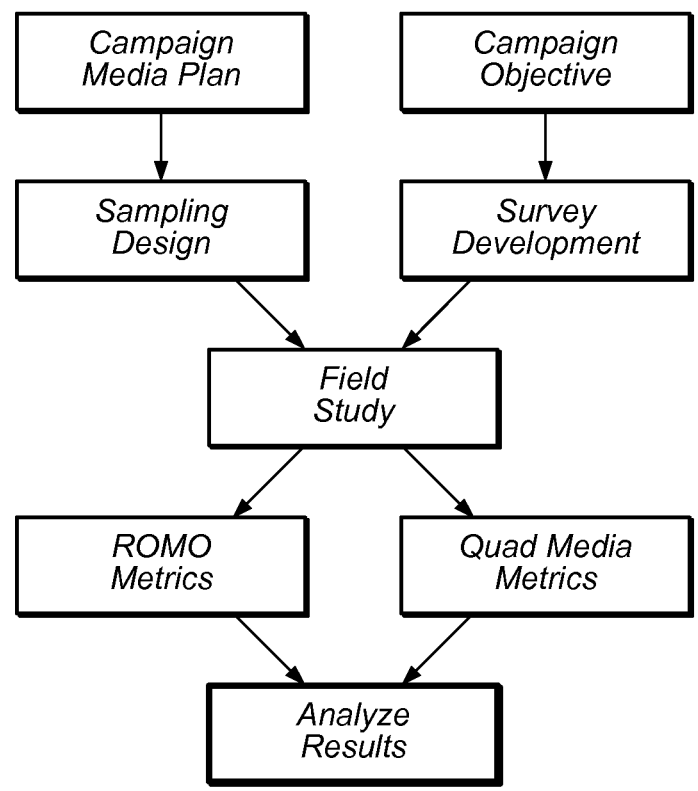
FIG. 1 is a schematic overview of the key elements used to create a study in accordance with the invention.

Description of the invention will now be given with reference to the appended FIGS. 1-19. It should be noted that these figures are exemplary in nature and in no way serve to limit the scope of the invention, which is defined by the claims appearing hereinbelow.

As noted above, the use of an Internet-based sample to project cross-media effects to the entire US is likely to encounter error, since the Internet universe is younger, wealthier, and better educated than the non-Internet universe. The inventive method offers two solutions to this issue. The first solution is to conduct multi-modal research which augments the online survey with a parallel telephone study among those without online access. As a less complete alternative, use telephone tracking studies to compare key branding metrics tracked in both a cross-media study and in a telephone based tracking study. The second option is to check to see that the online sample reflects the marketers target population. Since a telephone tracking parallel study involves significant cost, and many cross-media marketers are targeting the 18-49 age segment, a parallel telephone study is not always required. Some marketers determine that the natural skew of online reflects the natural skew of their segment. To execute the second option of cross-checking the online sample profile in terms of a key independent variable related to the marketing business, the inventive analysis first weights the online sample in terms of age and sex to reflect the overall US census numbers, then compares the online sample the independent variable to ensure alignment.

Another aspect of Internet/non-Internet dichotomy mentioned above is that of television viewing; the heavier users of the Internet tend to be the lightest TV viewers. To compensate, the inventive method encourages frequency capping on survey recruitment. This frequency capping ensures that if a respondent is not randomly selected to participate in the survey, he does not get another chance for selection for a defined period of time (e.g., 30 days). This systematically ensures lighter Internet users are sampled (which offset the bias in the heavier Internet users). In addition, the method further targets panels of users to create the opportunity of sampling users with Online access that have not been surfing the web recently (instead are only checking email).

As mentioned above, there are flaws in the basic exposed/not exposed scheme used in prior art. This lack of a true experimental design confounds the comparison of exposed and not exposed with a bias of Internet usage. In the inventive method, three safeguards are applied. The first, as mentioned previously is the use of frequency capping. The second approach is an Internet usage survey question. This scaled question allows the inventive method to weight up lighter users if the application of frequency capping could not be executed. The third safety mechanism is the tracking of control impressions. If the segmentation was not effectively executed for whatever reasons, the experimental design could be contaminated. "Contaminated" is the technical term to describe when a control respondent receives an exposed treatment, or exposed respondent is given a control treatment. Since the bias follows a systematic random distribution, removing the contaminated respondents has a greater impact on the heaviest online usage quintile. Without these safeguards, problems can occur. Since heavy Internet users tend to be light television viewers, the net impact of the heavy user bias in recruitment is that online surveys will tend to oversample the lightest television viewers and may result in an underestimation of the impact of TV ad campaigns. Of course, if the heaviest TV quintile is receiving 16 TV ads in 30 days, by under-sampling these heavier TV users, conventional studies could also make TV look more efficient than it really is by under-reporting those that have been over-delivered. Regardless of the direction, the inventive method addresses the bias.

The potential difficulties of projecting results from an Internet-only sample have already been noted above. Another challenge exists in this type of research: properly quantifying the complementary and individual effects of advertising in each media. As mentioned, the invention was designed to address the following three needs: the need to assess the complementary effects of cross-media campaigns; the need to dissect the results of a branding campaign to understand the individual contribution of each medium; and the need to measure the cost efficiency of different media for key marketing objectives.

FIG. 1 shows the key elements that are used to create a study in accordance with the invention. A key element of the research is the use of the sampling design to apply experimental design controls. The experimental design is based on a careful analysis of the media plan (and in some cases modifications to the media plan to enable better measurement). The survey itself is also critical. The survey is generally the mechanism by which dependent variables are measured and tracked. Additional qualitative measures are included in the survey that enables descriptive analysis of each individual media. A point of difference between conventional research and that under the invention is that, under the inventive method, the sampling design itself is used to create experimental controls to measure each media, while (Internet Media) ICM does not use a factorial experimental design and instead relies on survey questions to gauge media exposure probabilities (often called opportunity to see—OTS) after the plan has been executed.

It is possible to execute a study solely based on the sampling design without any use of a survey. Such a study could measure sales as a dependent variable and would enable the ROMO (return on marketing objective) analysis, but could not provide branding metrics or qualitative analysis. In essence, such as study would follow the left side of the figure above. ICM, on the other hand does not use the left side of the chart. The survey itself is the basis of managing a response to "exposed"/"not exposed" groups. The sampling design is carefully crafted to ensure orthogonal randomized media blocking within pools of respondents to create "exposed"/"control" and therefore the analysis relies only on the survey and cookies.

To illustrate an ICM study, one might ask a respondent how much TV did you watch last week, and use the answers to this question to classify into exposed and not exposed groups, or one might ask what the recall of a specific TV ad, and use this question to assign the respondent into a an exposed or not exposed cell. ICM is therefore using self stated recall as the basis for assignment. The inventive method uses externally validated facts such as date of survey (to calculate "pre" and "post") or zip code for classifying inclusion in exposed or control cells. Exposed control tag or magazine cover recognition. Each of these measures are much more accurate than what has been previously used prior to the invention.

Isolating the branding contribution of individual media is an important component of the invention, because results provide important direction for allocating budgets across media channels. As noted previously, studies under the inventive method rely on a combination of factorial experimental design and the timing of advertising within the ad schedule (measured using continuous tracking). The invention does not use the gathering of media exposure data from survey respondents to estimate individual media effects, but rather only uses this survey data for secondary "descriptive analysis". This is in stark contrast to ICM analysis which does not apply factorial experimental design and instead relies on survey data to estimate OTS to various media.

Figure 2:
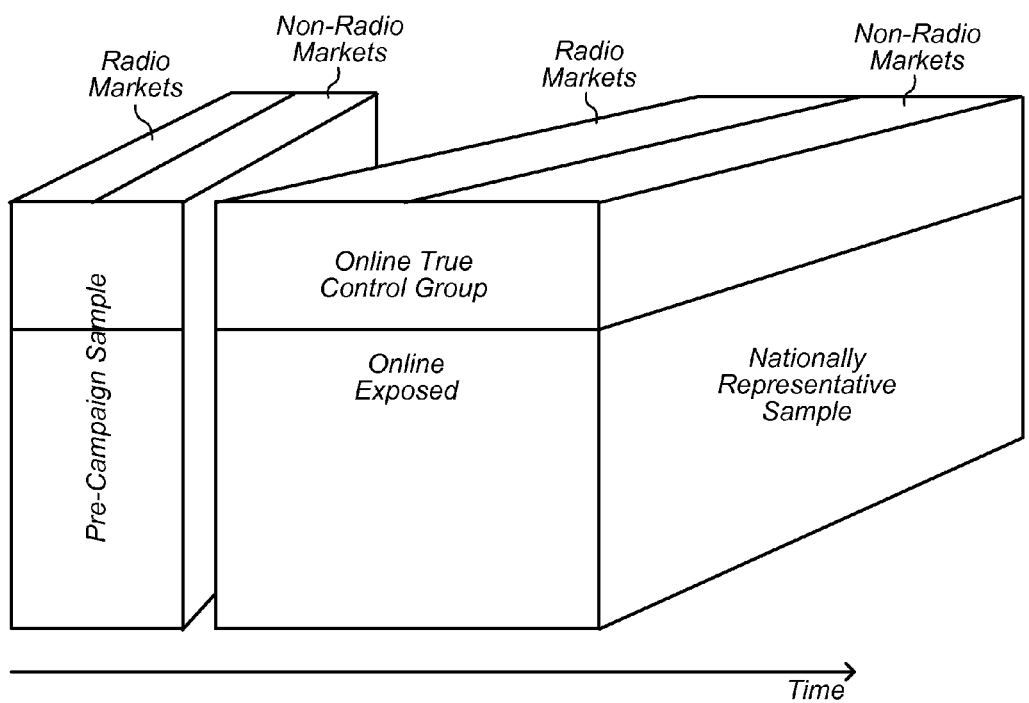
FIG. 2 is a graph depicting a factorial design with pre/post and exposed/control data plotted over time in accordance with the invention.

With regard to experimental design, the isolation of the Internet and at least one other medium, TV for example, is made possible by evaluating differences between the Internet test cell (exposed to Internet plus other medium) and control cell (exposed to other medium only). Adding a third medium, however, presents a challenge that can only be addressed by the application of a factorial experimental design. The factorial design means that each additional element has an experimental design itself which is orthogonal to the other experimental design, as shown in FIG. 2. A good example is Online, Radio and TV. We have already discussed how Online can be randomized to create exposed and control groups. To measure radio as part of the factorial experimental design, radio should run in a selection of specific geographic regions such as cities or, Designated Market Areas (DMAs). These DMAs where radio is running are the "exposed radio" cell. Weighting the remaining DMAs to match the exposed radio DMAs creates a matching "control" cell. Alternatively, a list of markets—for example 30 markets could be considered for a placement. Twenty then would be selected for exposed and ten markets for control. This would create matching and control markets. Some approaches can be applied to any media regionally.

Examination of the radio exposed cell will reveal that some respondents will be in the Online exposed cell, some in the online control cell, and others in neither. This randomized pattern is orthogonal. Think of it as a perpendicular plane to the 2×2 box above. The perpendicular plane turns the 2×2 box into a 2×2×2 cube. A factorial design tells us that the number of cells is $2^m$, where m is the number of stimuli measured—3 in this case.

Figure 3:
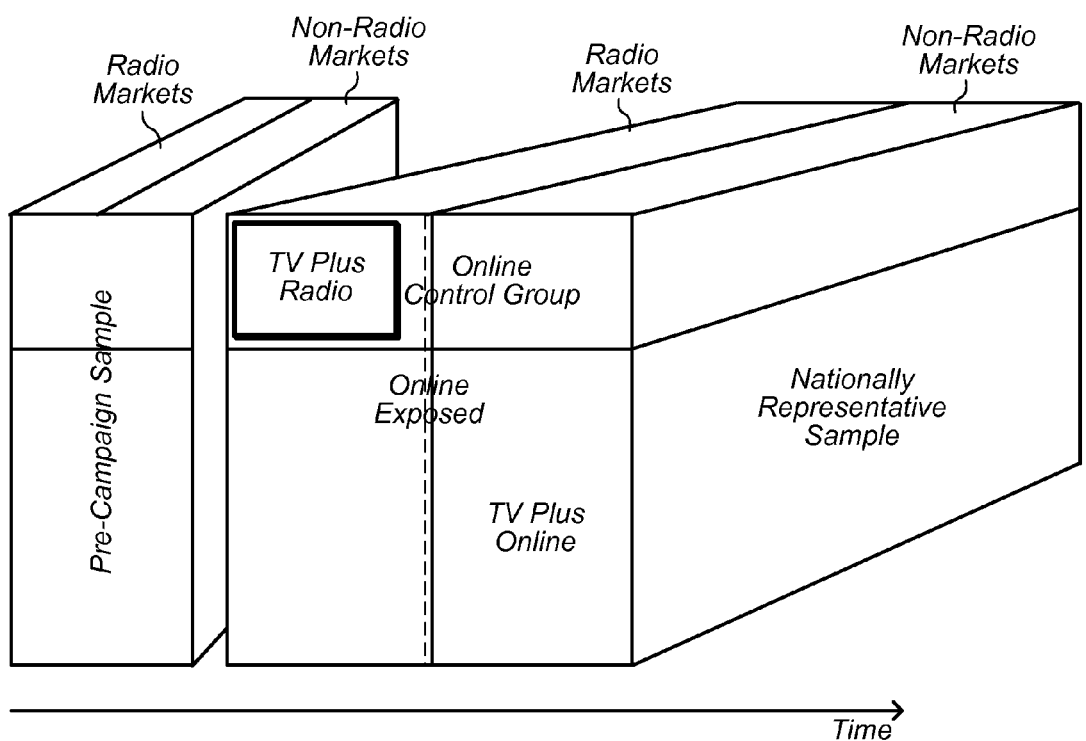
FIG. 3 is a graph depicting the various cells of a three-media factorial analysis in accordance with the present invention.

As shown in FIG. 3, provided that the sample sizes are large enough, the following cells can be analyzed:

| The independent effects of: |
|---|
| 1) no media |
| 2) online |
| 3) radio |
| 4) TV |
| The combined effects of: |
| 5) radio + online |
| 6) radio + TV |
| 7) online + TV |
| 8) online + TV + radio |

The inventive method uses factorial experimental designs and continuous tracking to provide a complete, fair measurement of each media's effect.

To contrast ICM with the inventive method, media exposure data gathered during ICM surveys might be used as a means to further shape the media effects uncovered through basic exposed/not exposed design. For example, it may make sense to compare the effects of respondents that were identified through the survey as having been exposed to various combinations of print, TV or Internet advertising to the overall exposed/not exposed pseudo experimental design results to determine if there's some kind of agreement. The combination of the ICM pseudo experimental design (exposed/not exposed) and the survey classifications of media exposure could provide some directionally important insights into effects, albeit not as statistically rigorous as a stand-alone, true experimental design. The inventive method uses a true factorial design which does produce statistically rigorous stand alone results on multiple media—their independent and complementary effects.

It will now be shown how data under the present inventive system is developed, analyzed, and used to derive a marketing mix. As noted above, the inventive method addresses at least three needs: 1) the need to assess the complementary effects of cross-media campaigns; 2) the need to dissect the results of a branding campaign to understand the individual contribution of each medium; and 3) the need to measure the cost efficiency of different media for various marketing objectives. As discussed above, there are six basic steps to the inventive method that enable it to fulfill these needs: 1) plotting the effectiveness of the combined campaign; 2) isolating the effects of different media; 3) examining complementary effects and synergies; 4) performing a dollar-for-dollar comparison (Return on Marketing Objective, or "ROMO" calculation) for each of the media; 5) recommending budget reallocations, if applicable; and 6) performing and providing post effectiveness, efficiency, and allocation analysis, specifically by providing descriptive advertising and media suggestions on each media independently.

The inventive factorial experimental design properly addresses steps 2 and 3 as described above; a quick recap of steps 1-3 is provided, followed by how steps 4 and 5 ensure an accurate analysis of the marketing mix as measured during a study under the inventive method, and how descriptive analysis is only performed after allocation analysis is complete. Step 6, the usage of descriptive OTS data to enhance the analysis, is only applied in the inventive method after the conclusions of relative effectiveness and cost efficiency have been determined. This is quite different from conventional ICM studies which may use the descriptive OTS in lieu of factorial experimental design and proper sampling design. (Step 6 will be discussed in greater detail below.)

Figure 4:
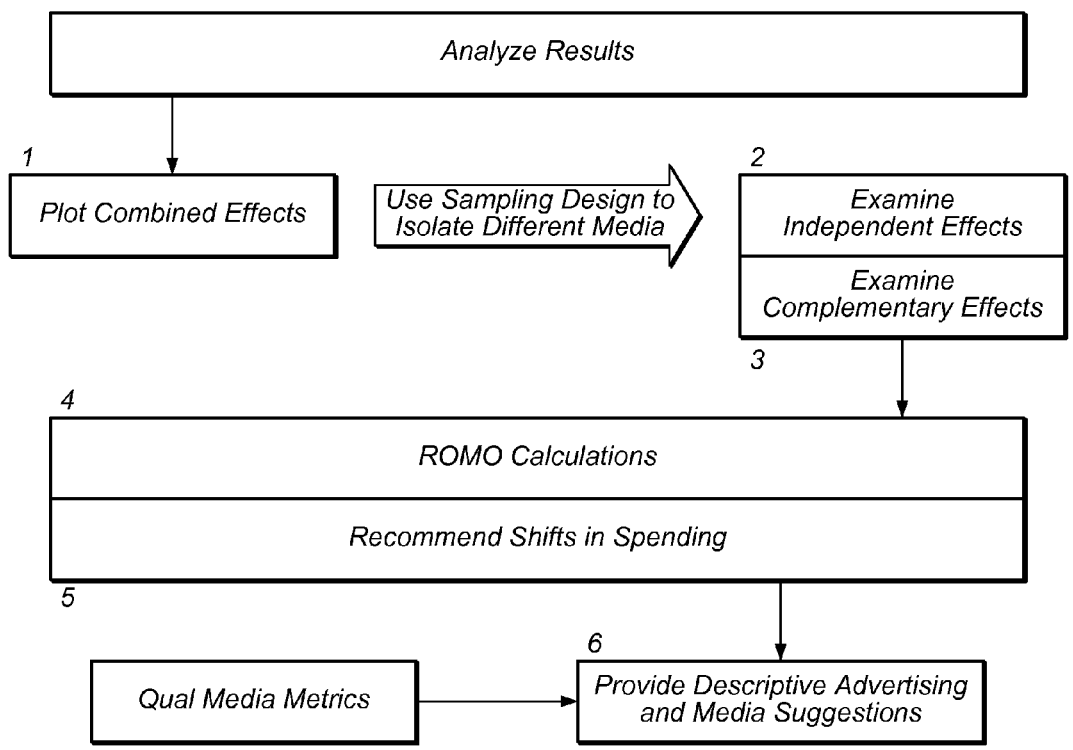
FIG. 4 is a schematic depicting the overall steps in an analytic method in accordance with the invention.

FIG. 4 shows the various steps in the inventive analysis. The analysis performed to the point of the ROMO calculation is based on the sampling design. The descriptive analysis is based on media questions within the survey designed to enhance the understanding of how each media is contributing to the overall results.

Figures 1, 5A:
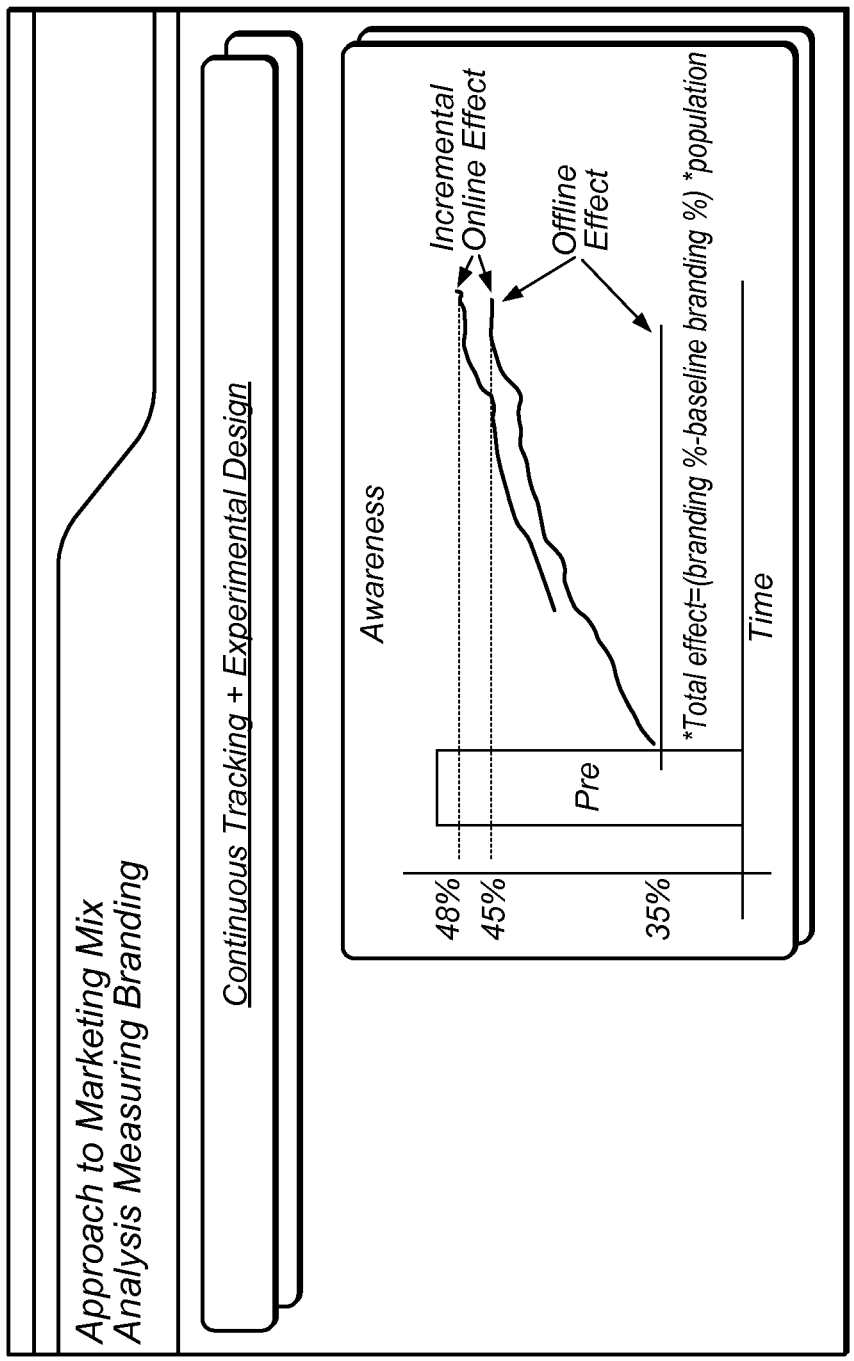
Figures 2, 5A:
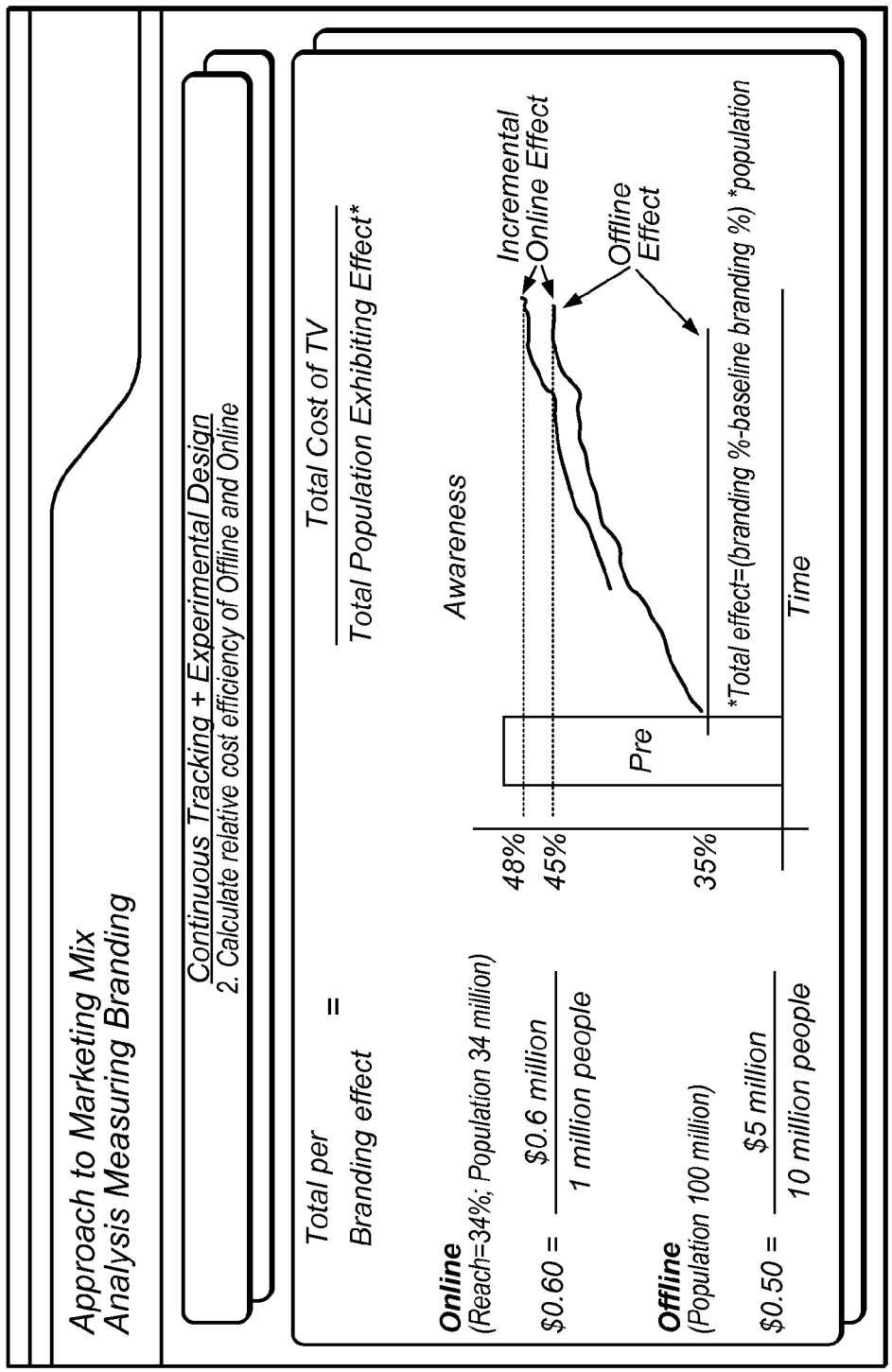
Figure 5B:
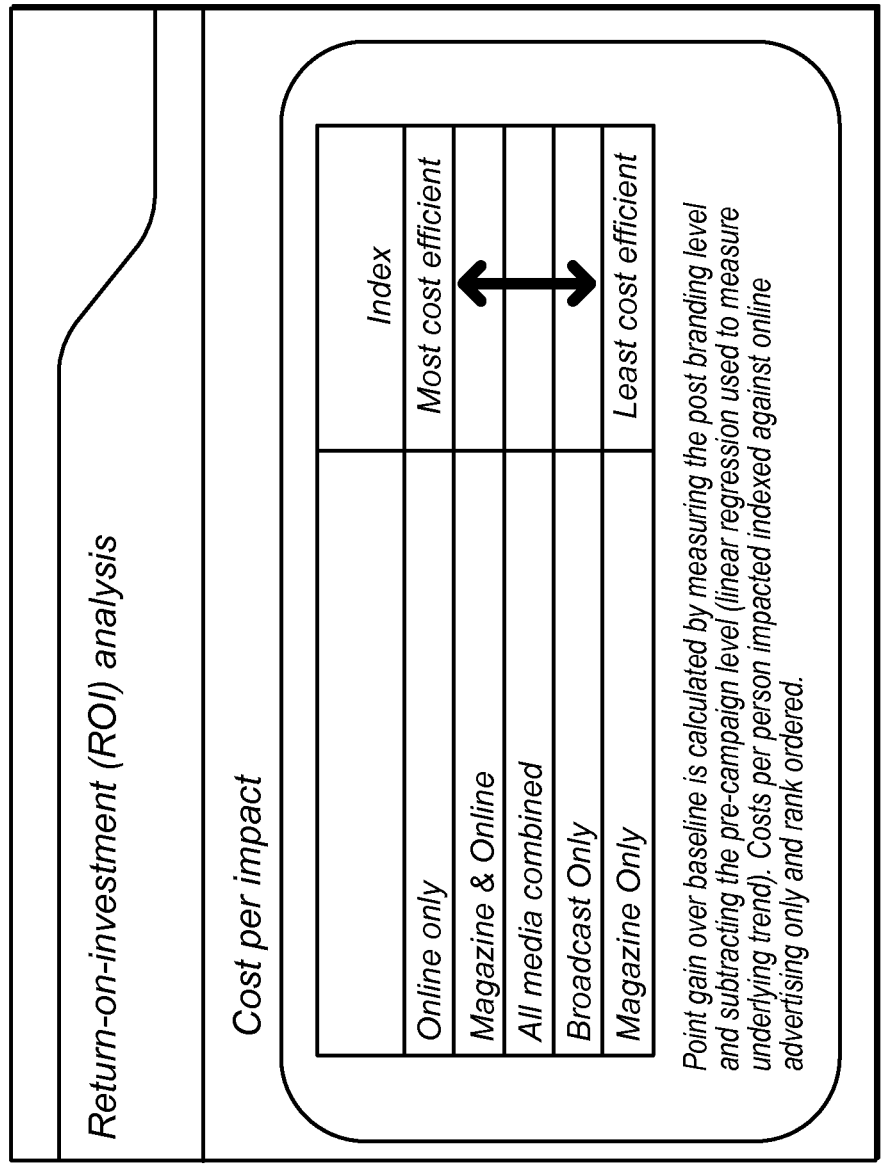
FIG. 5B is a chart depicting return-on-investment analysis of various media in a typical campaign in accordance with the invention.
Figure 6:
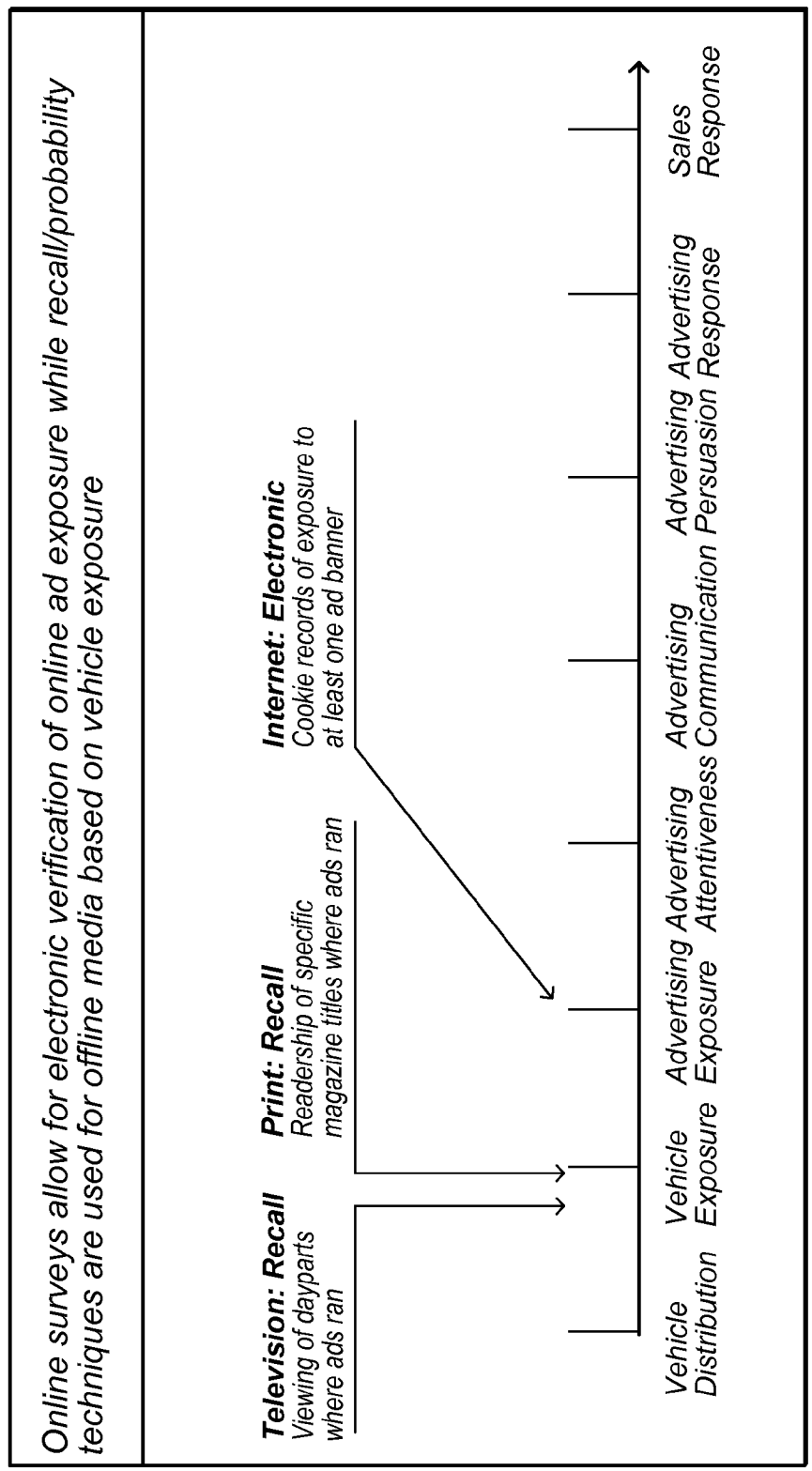
FIG. 6 is a chart depicting the disparity of online and offline verification of ad exposure.

Step 1: Plot the Effectiveness of the Combined Campaign. As shown in FIG. 5A, the inventive analysis takes the combined results on any given branding metric and trends them over time to see if the campaign caused upward trending. Prior to performing this analysis, the data is weighted to ensure that the total sample is reflective of the target population and that any over-samples required for the experimental design are scaled to their proper proportion within the target population. At this stage, the analysis is what a marketer would normally receive based on continuous tracking. There is no breakdown of individual media effects. Campaigns are trended by utilizing the equation of a line: y=mx+b or a curvilinear transformation of the line function. An alternative approach to campaign trending are the Repeated Measures (M)ANOVA models. These models are best utilized when taking multiple measures of the same variable across time (i.e., interested in change or trends); when conducting an experimental design; and when interested in comparing group differences across a repeated measure. E.g. in market research one might examine media differences on some variable of interest (such as purchase intent, intent to shop, intent to tune in, motivational attributes) across time. One might also examine long term advertising effects based on different flighting methods. The statistical model is represented using matrix algebra thusly $$Y_{nx1} = X_{nxn}\beta_{nx1} + E_{nx1}$$

where
Y is a vector of outcome measures with n-rows and 1-column,
X is a matrix of zero's and one's with n-rows and n-columns, which represent various levels of the independent variables,
β is a vector of coefficients with n-rows and 1-column, which represent values of the independent variables,
E or epsilon is a vector with n-rows and 1-column.

Step 2: Isolate the Effects of Different Media

Both steps 2 and 3 are based on using the inventive sampling design to separate out media effects. Since the media plan is executed in such a way as to enable factorial experimental design blocking of media exposure, population analysis is fairly straight-forward. FIG. 2 highlights one such example with TV, radio and online.

As shown in the Figures, the two media which can be experimentally blocked are online and radio (provided radio is bought by market and not nationally). Television can be experimentally blocked by using split cable or targeted geo-zoning, or geo based cut-ins, but that option is generally not used due to the cost and other limitations. Instead, television is measured by stripping away the effects of radio and online (looking at the control groups of each) and trending results from the pre-campaign baseline to the end of the campaign. This is the point at which continuous tracking and factorial experimental design merge. While this analysis does not indicate the effect on any one individual respondent, it does provide population based effects which can be indexed against population level advertising spend on each media.

Figure 11:
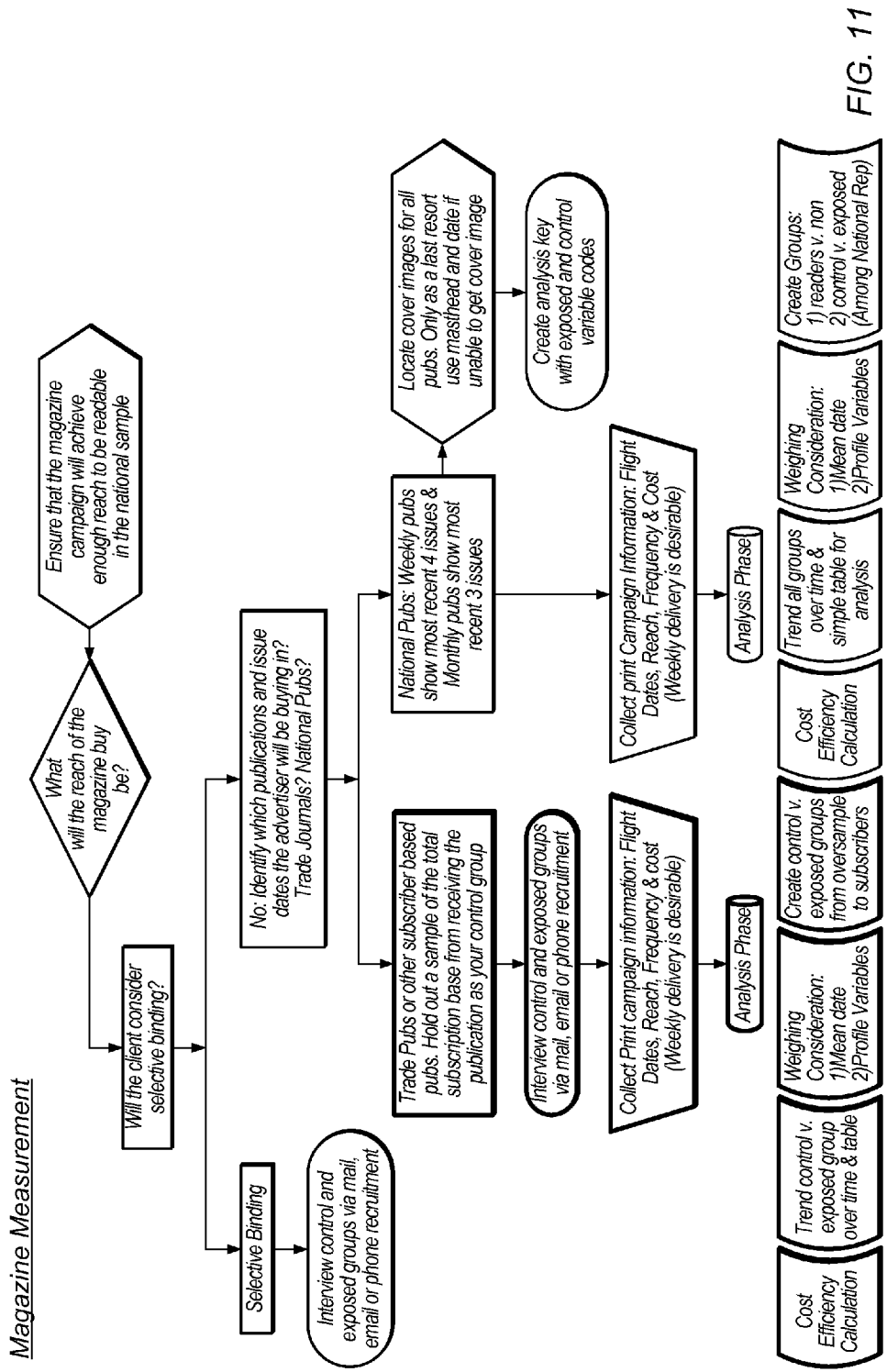
FIG. 11 is a flow chart depicting how the inventive method isolates the effects of a magazine buy.

An analysis of a magazine buy is depicted in FIG. 11 and described below.

What will the reach of the magazine buy be?
  i. Ensure that the magazine campaign will achieve enough reach to be readable in the national sample.
  ii. Will the client consider selective binding?
    a. Selective Binding:
      i. Interview control & exposed groups via mail, email, or phone recruitment.
    b. No, identify which publications and issue dates the advertiser will be buying in? Trade Journals? National Publications?
      i. Trade pubs or other subscriber based pubs. Hold out a sample of the total subscription base from receiving the pub as your control group.
      ii. Interview control & exposed groups via mail, email, or phone recruitment.
      iii. Collect Print campaign information: Flight dates, Reach, Frequency, & cost (weekly delivery is desirable).
      iv. Analysis Phase (Trade Pubs)
        1. Cost Efficiency Calculation $$\text{Magazine} = \frac{C_M}{R_M[w_i d_i (E_{X_{TIME}} - C_{X_{TIME}})]P_t} = \varepsilon_M$$

Where,
$\varepsilon_M$=The overall effectiveness of magazine advertising on the campaign,
$C_{M_i}$=Cost of the magazine advertising $$R_M = \text{Reach} = \left[\frac{\left(\frac{N_{IMP}}{\overline{X}_{Freq}}\right)P_{QT}}{N_{TP}}\right]$$

Where,
$N_{IMP}$=# of Impressions
$\overline{X}_{Freq}$=Average Frequency
$P_{QT}$=Percent Qualified for Target
$N_{TP}$=Sample size for the "Target Population."
        2. Trend Control V. Exposed Groups Over Time & Table.

$$y = mx + b$$

$$\frac{\sum (\% \ TT)(n_i)}{N_T} = \text{Moving Average}$$

Where,
$n_i$=Sample size per day for top two
$N_T$=Total sample size for (n) day period
% TT=% of top two box by day.
        3. Weighting Considerations:
          Mean Date i. $\mu = \frac{\sum d_i}{n}$ $d_i$=Day i
n=number of days
Profile Variables.
$w_i d_i$=Weight by Demographics Where, $C\_E \text{ Weight} = \frac{(\%)(\text{Count})}{n_i}$ 4. Create Control V. Exposed Groups from Oversample to Subscribers.
   $C_{\bar{x}_{TIME}}$=Control average or median time for viewing magazine A.
   $E_{\bar{x}_{TIME}}$=Exposed average or median time for viewing magazine A.

$$t = \frac{(\bar{x}_E - \bar{x}_C)}{\sqrt{\left(\frac{s_E + s_C}{n_E + n_C - 2}\right)\left(\frac{1}{n_E} + \frac{1}{n_C}\right)}}$$

($\bar{x}_E$—Mean of Exposed group, $\bar{x}_c$—Mean of Control group)
$s_E$=Standard deviation of Exposed group, $s_C$=Standard deviation of Control. group.
$n_E$=Sample size for exposed group, $n_C$=sample size for control group.

$$F = \frac{MS_B}{MS_W}$$

($MS_B$—Mean Square Between Groups, $MS_W$—Mean Square Within Groups)
c. National Pubs: Weekly pubs show most recent 4 issues & Monthly pubs show most recent 3 issues.
   i. Collect Print campaign information: Flight dates, Reach, Frequency, & cost (weekly delivery is desirable).
   ii. Analysis Phase (National Pubs)
      1. Cost Efficiency Calculation $$\text{Magazine} = \frac{C_M}{R_M [w_i d_i (E_{\bar{x}_{TIME}} - C_{\bar{x}_{TIME}})] P_t} = \varepsilon_M$$

Where,
$\varepsilon_M$=The overall effectiveness of magazine advertising on the campaign,
$C_{M_i}$=Cost of the magazine advertising $$R_M = \text{Reach} = \left[\frac{\left(\frac{N_{IMP}}{\bar{x}_{Freq}}\right) P_{QT}}{N_{TP}}\right]$$

Where,
$N_{IMP}$=# of Impressions
$\bar{x}_{Freq}$=Average Frequency
$P_{QT}$=Percent Qualified for Target
$N_{TP}$=Sample size for the "Target Population."

2. Trend Control V. Exposed Groups Over Time & Table.

$y = mx + b$ $$\frac{\sum (\% \, TT)(n_i)}{N_T} = \text{Moving Average}$$

Where,
$n_i$=Sample size per day for top two
$N_T$=Total sample size for (n) day period
% TT=% of top two box by day.
3. Weighting Considerations:
   Mean Date i. $\mu = \frac{\sum d_i}{n}$ $d_i$=Day i
n=number of days
Profile Variables.
$w_i d_i$=Weight by Demographics Where, $C\_E \text{ Weight} = \frac{(\%)(\text{Count})}{n_i}$ 4. Create Readers v. Non-readers and Control v. exposed (Among National Rep). (ANOVA, T-test)
   $C_{\bar{x}_{TIME}}$=Control (Non-reader) average or median time for viewing magazine.
   $E_{\bar{x}_{TIME}}$=Exposed (Reader) average or median time for viewing magazine.

$$t = \frac{(\bar{x}_E - \bar{x}_C)}{\sqrt{\left(\frac{s_E + s_C}{n_E + n_C - 2}\right)\left(\frac{1}{n_E} + \frac{1}{n_C}\right)}}$$

($\bar{x}_E$—Mean of Exposed group, $\bar{x}_c$—Mean of Control group)
$s_E$=Standard deviation of Exposed group, $s_C$=Standard deviation of Control. group.
$n_E$=Sample size for exposed group, $n_C$=sample size for control group.

$$F = \frac{MS_B}{MS_W}$$

Figure 12:
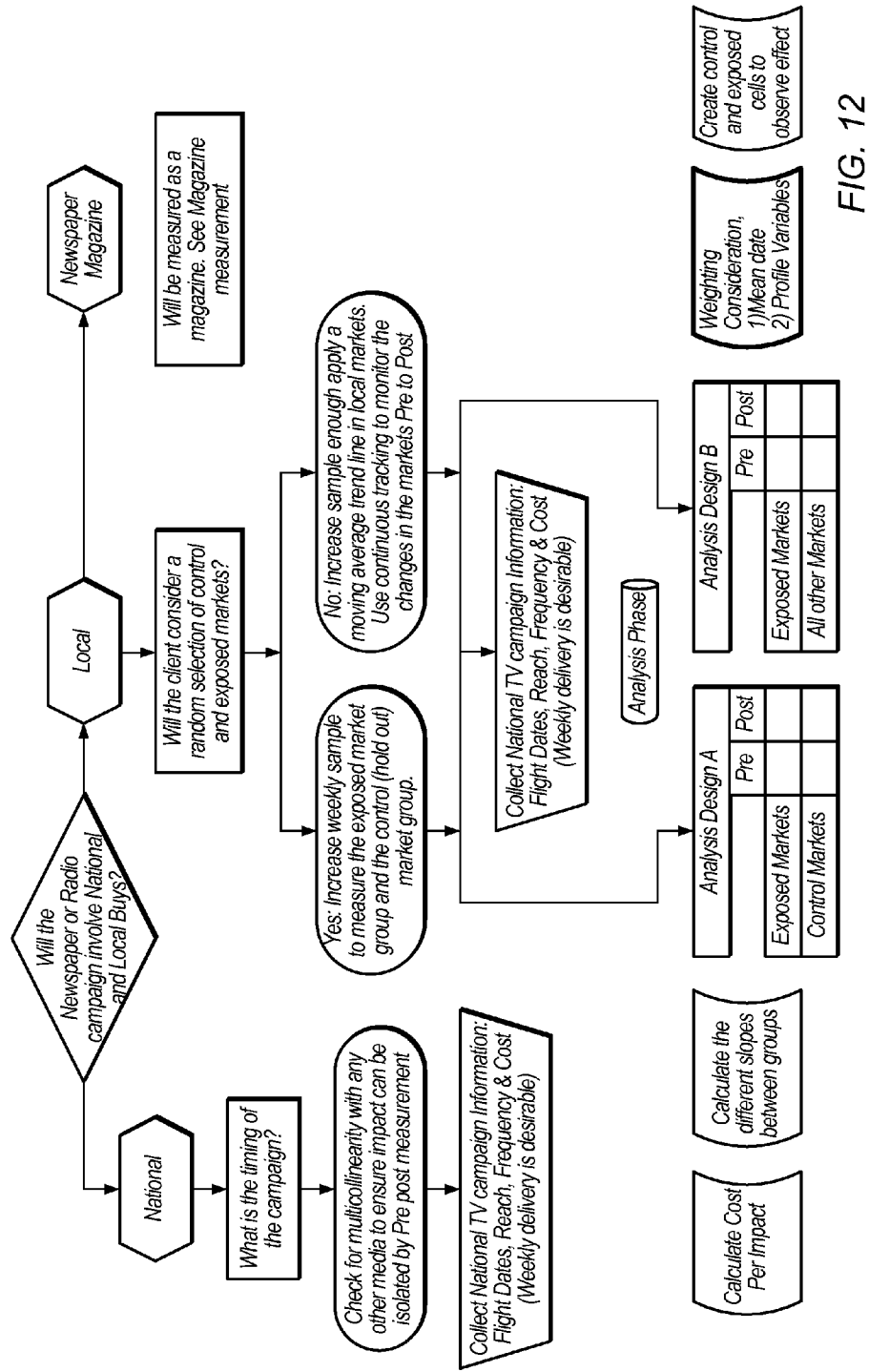
FIG. 12 is a flow chart depicting how the inventive method isolates the effects of a newspaper or radio campaign.

($MS_B$—Mean Square Between Groups, $MS_W$—Mean Square Within Groups)
An analysis of a newspaper or radio campaign is depicted in FIG. 12 and described below.
Newspaper or Radio Measurement
Will the Newspaper or Radio campaign involve National and Local buys?
   1. National
   a. What is the timing of the campaign?
   b. Check for multicollinearity with any other media to ensure impact can be isolated by Pre-post measurement.

c. Collect Print campaign information: Flight dates, Reach, Frequency, & cost (weekly delivery is desirable).
2. Local
a. Will the client consider a random selection of control and exposed markets?
   i. Yes: Increase weekly sample to measure the exposed market group and the control market group.
   ii. No: Increase sample enough to apply a moving average trend line in local markets. Use continuous tracking to monitor the changes in the markets pre to post.
b. Collect Print campaign information: Flight dates, Reach, Frequency, & cost (weekly delivery is desirable).
c. Analysis Phase (Radio)
   i. Calculate CPI $$\text{Radio} = \frac{C_{Ri}}{R_R[w_i d_i (E_R - C_R)] P_t} = \varepsilon_R$$

Where,
$\varepsilon_R$=The overall effectiveness of radio advertising on the campaign.
$C_{R_i}$=Cost of the radio advertising.

$$R_R = \text{Reach} = \left[\frac{\left(\frac{N_{IMP}}{\bar{x}_{Freq}}\right) P_{QT}}{N_{TP}}\right]$$

Where,
$N_{IMP}$=# of Impressions
$\bar{x}_{Freq}$=Average Frequency
$P_{QT}$=Percent Qualified for Target
$N_{TP}$=Sample size for the "Target Population."
$w_i d_i$=Weight by Demographics
Where, $$\text{C\_E Weight} = \frac{(\%)(\text{Count})}{n_i}$$

a. Weight=(% of total C&E within each group*Count per individual Group (control & Exposed))/(Current Sample Size)
$C_R$=Control group for Radio within market A.
$E_R$=Exposed group for Radio within market B.
   a.
   ii. Calculate the different slopes between groups a. $y = mx + b$
   b. $\frac{\sum (\% \, TT)(n_i)}{N_T} = \text{Moving Average}$ Where,
$n_i$=Sample size per day for top two
$N_T$=Total sample size for (n) day period
% TT=% of top two box by day.

iii. Pre-Post by Control v. Exposed or Not Exposed v. Exposed. (ANOVA, T-test)

$$t = \frac{(\bar{x}_E - \bar{x}_C)}{\sqrt{\left(\frac{s_E + s_C}{n_E + n_C - 2}\right)\left(\frac{1}{n_E} + \frac{1}{n_C}\right)}}$$

($\bar{x}_E$—Mean of Exposed group, $\bar{x}_C$—Mean of Control group)
$s_E$=Standard deviation of Exposed group, $s_C$=Standard deviation of Control. group.
$n_E$=Sample size for exposed group, $n_C$=sample size for control group.

$$F = \frac{MS_B}{MS_W}$$

($MS_B$—Mean Square Between Groups, $MS_W$—Mean Square Within Groups)
   a.
   iv. Weighting Considerations:

$$\mu = \frac{\sum d_i}{n}$$

a. Mean Date
      $d_i$=Day
      n=number of days
   b. Profile Variables.
      $w_i d_i$=Weight by Demographics Where, $\text{C\_E Weight} = \frac{(\%)(\text{Count})}{n_i}$ v. Create Control & Exposed Cells to Observe Effect. (Anova, T-Test)

$$t = \frac{(\bar{x}_E - \bar{x}_C)}{\sqrt{\left(\frac{s_E + s_C}{n_E + n_C - 2}\right)\left(\frac{1}{n_E} + \frac{1}{n_C}\right)}}$$

($\bar{x}_E$—Mean of Exposed group, $\bar{x}_C$—Mean of Control group)
$s_E$=Standard deviation of Exposed group, $s_C$=Standard deviation of Control. group.
$n_E$=Sample size for exposed group, $n_C$=sample size for control group.

$$F = \frac{MS_B}{MS_W}$$

($MS_B$—Mean Square Between Groups, $MS_W$—Mean Square Within Groups)

d. Analysis Phase (Newspaper)
  i. Calculate CPI $$\text{Newspaper} = \frac{C_{NP_i}}{R_{NP}[w_i d_i (E_{NP} - C_{NP})]P_t} = \varepsilon_{NP}$$

Where, $\varepsilon_{NP}$=The overall effectiveness of Newspaper advertising on the campaign.

$C_{NP_i}$=Cost of the Newspaper advertising.

$$R_{NP} = \text{Reach} = \left[\frac{\left(\frac{N_{IMP}}{\overline{x}_{Frep}}\right)P_{QT}}{N_{TP}}\right]$$

Where, $N_{IMP}$=# of Impressions
$\overline{x}_{Freq}$=Average Frequency
$P_{QT}$=Percent Qualified for Target
$N_{TP}$=Sample size for the "Target Population."
$w_i d_i$=Weight by Demographics Where, $$\text{C\_E Weight} = \frac{(\%)(\text{Count})}{n_i}$$

b. Weight=(% of total C&E within each group*Count per individual Group (control & Exposed))/(Current Sample Size)

$C_{NP}$=Control group for Newspaper within market A.
$E_{NP}$=Exposed group for Newspaper within market B.

ii. Calculate the different slopes between groups a. $y = mx + b$ b. $\dfrac{\sum (\% \ TT)(n_i)}{N_T} = \text{Moving Average}$ Where, $n_i$=Sample size per day for top two
$N_T$=Total sample size for (n) day period
% TT=% of top two box by day.

iii. Pre-Post by Control v. Exposed or Not Exposed v. Exposed. (ANOVA, T-test)

$$t = \frac{(\overline{x}_E - \overline{x}_C)}{\sqrt{\left(\frac{s_E + s_C}{n_E + n_C - 2}\right)\left(\frac{1}{n_E} + \frac{1}{n_C}\right)}}$$

($\overline{x}_E$—Mean of Exposed group, $\overline{x}_C$—Mean of Control group)
$s_E$=Standard deviation of Exposed group, $s_C$=Standard deviation of Control. group.
$n_E$=Sample size for exposed group, $n_C$=sample size for control group.

$$F = \frac{MS_B}{MS_W}$$

($MS_B$—Mean Square Between Groups, $MS_W$—Mean Square Within Groups)
  a.
  iv. Weighting Considerations:

$$\mu = \frac{\sum d_i}{n}$$

a. Mean Date
    $d_i$=Day i
    n=number of days
  b. Profile Variables.
    $w_i d_i$=Weight by Demographics Where, $\text{C\_E Weight} = \dfrac{(\%)(\text{Count})}{n_i}$ v. Create Control & Exposed Cells to Observe Effect. (ANOVA, T-Test)

$$t = \frac{(\overline{x}_E - \overline{x}_C)}{\sqrt{\left(\frac{s_E + s_C}{n_E + n_C - 2}\right)\left(\frac{1}{n_E} + \frac{1}{n_C}\right)}}$$

($\overline{x}_E$—Mean of Exposed group, $\overline{x}_C$—Mean of Control group)
$s_E$=Standard deviation of Exposed group, $s_C$=Standard deviation of Control. group.
$n_E$=Sample size for exposed group, $n_C$=sample size for control group.

$$F = \frac{MS_B}{MS_W}$$

($MS_B$—Mean Square Between Groups, $MS_W$—Mean Square Within Groups)

Figure 13:
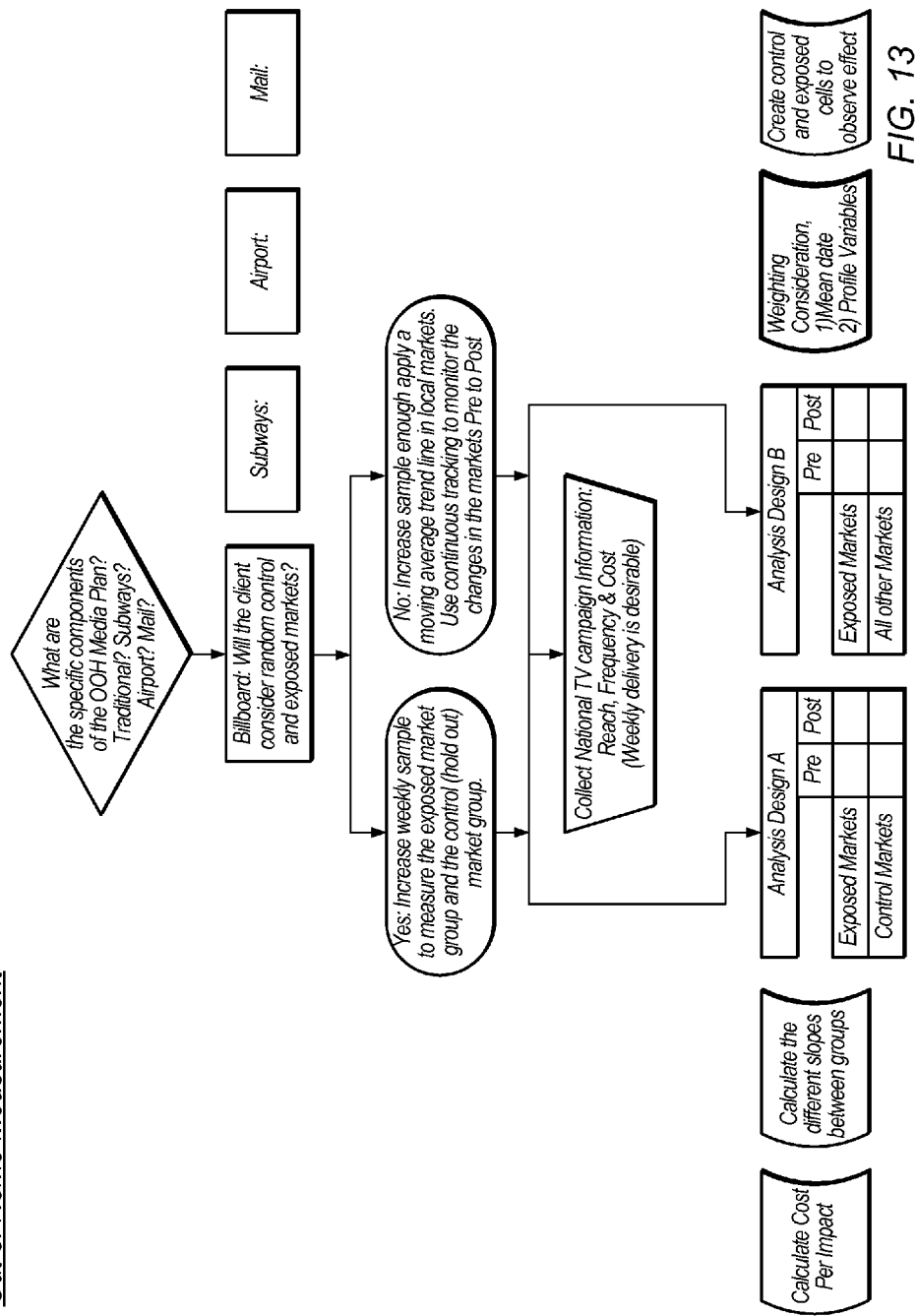
FIG. 13 is a flow chart depicting how the inventive method isolates the effects of an out of home campaign.

An analysis of an out of home (OOH) campaign is depicted in FIG. 13 and described below.

OOH Measurement

What are the specific components of the OOH Media Plan?
  1. Subways
  2. Airport
  3. Mall
  4. Billboards: Will the client consider random control and exposed markets?
    a. Yes: Increase weekly sample to measure the exposed market group and the control market group.
    b. No: Increase sample enough to apply a moving average trend line in local markets. Use continuous tracking to monitor the changes in the markets pre to post.

$$\frac{\sum (\% \ TT)(n_i)}{N_T} = \text{Moving Average}$$

Where,
- $n_i$=Sample size per day for top two
- $N_T$=Total sample size for (n) day period
- % TT=% of top two box by day.

e. Collect Print campaign information: Flight dates, Reach, Frequency, & cost (weekly delivery is desirable).

f. Analysis Phase (OOH)
  i. Calculate CPI a. $OOH = \dfrac{C_{OOH_i}}{V_I}$ b. Where,
     i. $C_{OOH_i}$=Cost for Out of Home Campaign
     ii. $V_I$=Volume impacted by media
  ii. Calculate the different slopes between groups a. $y = mx + b$ b. $\dfrac{\sum (\% \ TT)(n_i)}{N_T}$ = Moving Average Where,
  - $n_i$=Sample size per day for top two
  - $N_T$=Total sample size for (n) day period
  - % TT=% of top two box by day.

c.
  iii. Pre-Post by Control v. Exposed or Not Exposed v. Exposed. (ANOVA, T-test)

$$t = \dfrac{(\bar{x}_E - \bar{x}_C)}{\sqrt{\left(\dfrac{s_E + s_C}{n_E + n_C - 2}\right)\left(\dfrac{1}{n_E} + \dfrac{1}{n_C}\right)}}$$

($\bar{x}_E$—Mean of Exposed group, $\bar{x}_C$—Mean of Control group)
  $s_E$=Standard deviation of Exposed group, $s_C$=Standard deviation of Control. group.
  $n_E$=Sample size for exposed group, $n_C$=sample size for control group.

$$F = \dfrac{MS_B}{MS_W}$$

($MS_B$—Mean Square Between Groups, $MS_W$—Mean Square Within Groups)

iv. Weighting Considerations:
    a. Mean Date $$\mu = \dfrac{\sum d_i}{n}$$

$d_i$=Day
    n=number of days b. Profile Variables.
       $w_i d_i$=Weight by Demographics Where, C_E Weight = $\dfrac{(\%)\,(Count)}{n_i}$ v. Create Control & exposed cells to observe effect. (ANOVA, T-test)

$$t = \dfrac{(\bar{x}_E - \bar{x}_C)}{\sqrt{\left(\dfrac{s_E + s_C}{n_E + n_C - 2}\right)\left(\dfrac{1}{n_E} + \dfrac{1}{n_C}\right)}}$$

($\bar{x}_E$—Mean of Exposed group, $\bar{x}_C$—Mean of Control group)
  $s_E$=Standard deviation of Exposed group, $s_C$=Standard deviation of Control. group.
  $n_E$=Sample size for exposed group, $n_C$=sample size for control group.

$$F = \dfrac{MS_B}{MS_W}$$

($MS_B$—Mean Square Between Groups, $MS_W$—Mean Square Within Groups)

Figure 14A:
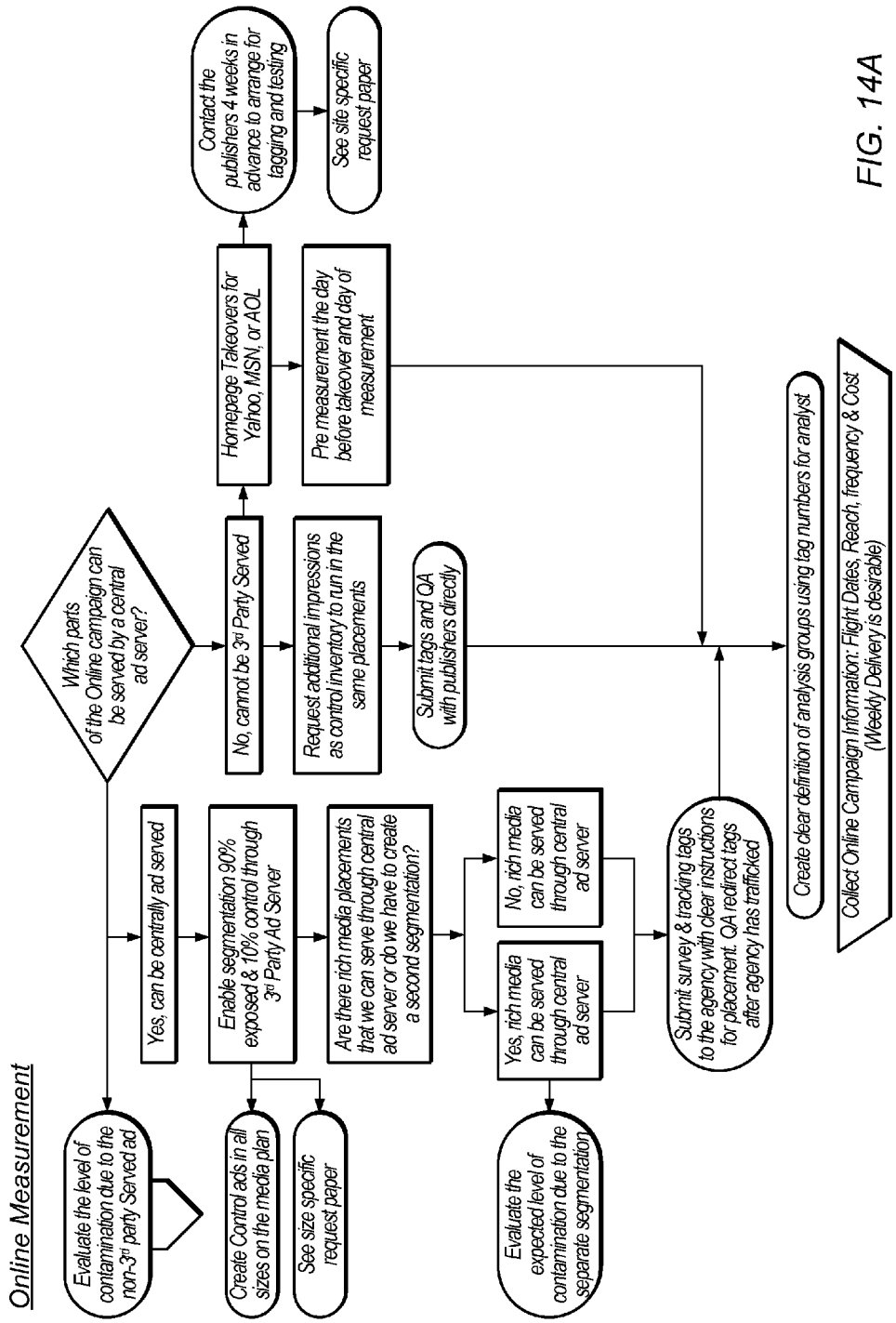
FIGS. 14A-B are a flow chart depicting how the inventive method isolates the effects of an online campaign.
Figure 14B:
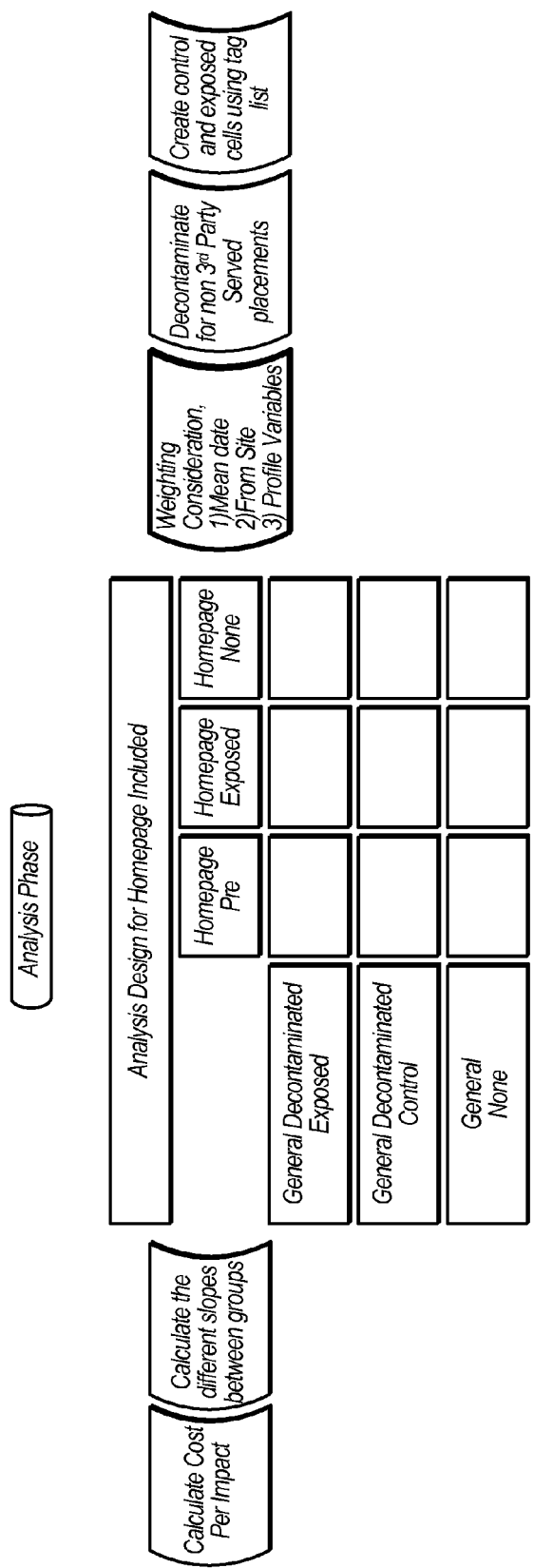

An analysis of an online campaign is depicted in FIGS. 14A-B and described below.

Online Measurement

Which parts of the Online campaign can be served by a central ad server?

1. Evaluate the level of contamination due to the non-3rd party served ad.
2. Yes: Can be centrally ad served
   a. Enable segmentation: 90% exposed, 10% control through 3rd party Ad server.
      i. Create control ads in all sizes on the media plan.
      ii. See site specific request paper
   b. Are there rich media placements that we can serve through central ad server or do we have to create a second segmentation?
      i. Yes: rich media can be served through central ad server.
         1. No: rich media can not be served through central ad server.
         2. Evaluate the expected level of contamination due to the separate segmentation.
      ii. Evaluate the expected level of contamination due to the separate segmentation.
   c. Submit survey & tracking tags to the agency with clear instructions for placement. QA redirect tags after agency has trafficked.
3. No: Cannot be 3rd party served
   a. Homepage takeovers for Yahoo, MSN, or AOL
      i. Pre measurement the day before takeover and day of measurement.
      ii. Contact the publishers 4 weeks in advance to arrange for tagging and testing.
         1. See site specific request paper
   b. Request additional impressions as control inventory to run in the same placements.
   c. Submit tags and QA with publishers directly 4. Create clear definition of analysis groups using tag numbers for analyst.
5. Collect Online Campaign information: Flight date, Reach, Frequency, & Cost (weekly delivery is desirable).
6. Analysis Phase (Online)
 a. Calculate CPI a. $\text{Online} = \dfrac{C_{Online_i}}{V_I}$ b. Where,
  i. $C_{Online_i}$=Cost for Online Campaign
  ii. $V_I$=Volume impacted by media $$\text{Online} = \dfrac{C_{Online}}{R_O[w_i d_i (E_O - C_O) DF_i] P_t} = \varepsilon_O$$

Where,
$\varepsilon_O$=The overall effectiveness of Online advertising on the campaign.
$C_O$=Control group for Online.
$E_O$=Exposed group for Online.

$$R_O = \text{Reach} = \left[\dfrac{\left(\dfrac{N_{IMP}}{\overline{x}_{Freq}}\right) P_{QT}}{N_{TP}}\right]$$

or Agency will provide 'Reach.'
 Where,
  $N_{IMP}$=# of Impressions
  $\overline{x}_{Freq}$=Average Frequency
  $P_{QT}$=Percent Qualified for Target
  $N_{TP}$=Sample size for the "Target Population."
  $DF_i$=Decay Factor=$t_{CS}-t_{LH}$ $$y = \beta_0 + DF_1 \beta_1 + DF_2^2 \beta_2^2 + \ldots + DF_k^k \beta_k^k \quad \text{(Linear Equation)}$$

Where,
  $t_{CS}$=Time Completed Survey
  $t_{LH}$=Time Last Hit
 b. Calculate the effect among different groups $$t = \dfrac{(\overline{x}_E - \overline{x}_C)}{\sqrt{\left(\dfrac{s_E + s_C}{n_E + n_C - 2}\right)\left(\dfrac{1}{n_E} + \dfrac{1}{n_C}\right)}}$$

($\overline{x}_E$—Mean of Exposed group, $\overline{x}_C$—Mean of Control group)
$s_E$=Standard deviation of Exposed group, $s_C$=Standard deviation of Control. group.
$n_E$=Sample size for exposed group, $n_C$=sample size for control group.

$$F = \dfrac{MS_B}{MS_W}$$

($MS_B$—Mean Square Between Groups, $MS_W$—Mean Square Within Groups)

c. Analysis Design
  i. General Decontaminated Exposed*General Decontaminated Control*General None by Homepage Pre*Homepage Exposed*Homepage None (3×3 Matrix)
 d. Weighting Consideration
  i. Mean Date 1. $\mu = \dfrac{\sum d_i}{n}$ $d_i$=Day i
  n=number of days
  ii. From Site
  iii. Profile Variables
  $w_i d_i$=Weight by Demographics Where, $\text{C\_E Weight} = \dfrac{(\%)(\text{Count})}{n_i}$ e. Decontaminate for non-3$^{rd}$ party served placements
 f. Create control and exposed cells using tag list.

$$t = \dfrac{(\overline{x}_E - \overline{x}_C)}{\sqrt{\left(\dfrac{s_E + s_C}{n_E + n_C - 2}\right)\left(\dfrac{1}{n_E} + \dfrac{1}{n_C}\right)}}$$

($\overline{x}_E$—Mean of Exposed group, $\overline{x}_C$—Mean of Control group)
$s_E$=Standard deviation of Exposed group, $s_C$=Standard deviation of Control. group.
$n_E$=Sample size for exposed group, $n_C$=sample size for control group.

$$F = \dfrac{MS_B}{MS_W}$$

($MS_B$—Mean Square Between Groups, $MS_W$—Mean Square Within Groups)

It is preferred that three channels of data be provided to achieve accurate online impression delivery data. These three streams of data "Survey Data", "Panel Data", and "Ad Server Data", are shown being processed in FIG. 18, and the various sources of data for such online impressions are depicted in FIG. 19.

Figure 19:
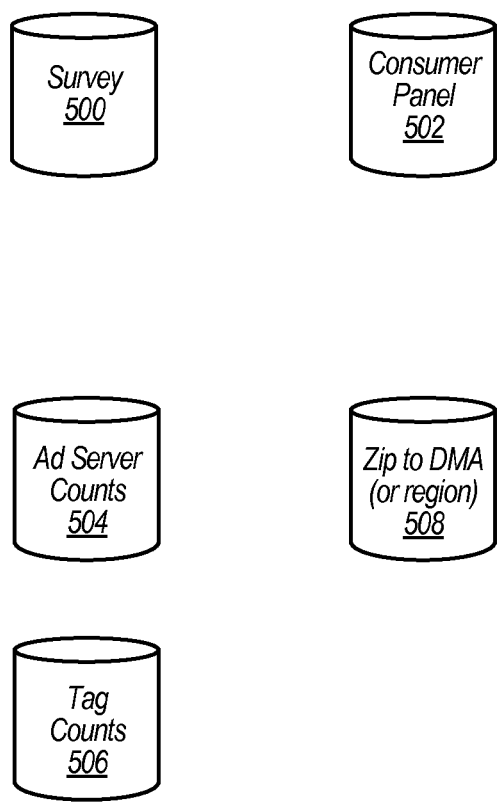
FIG. 19 is a schematic illustrating the available sources of online impressions data.

As shown in FIG. 19, sources of GRP online impressions data may include, in one example, Survey based source 500, Consumer Panel 502, Ad Server count 504, Tag Counts 508, and Zip to DMA (or other region translation table) 510.

Survey-based source 500 may include: International count; % of users by zip code (translates to unique impression); % of users x freq by zip (translates to total impression); % of users sharing computers; % of users using multi computers. Advantage: International user count (representative of full campaign)

Consumer Panel 502 may include: Unique impression delivered by zip; Total impressions delivered by zip. Consumer Panel 502 may not include: International impressions; % sharing computer; % using m. Advantage: Larger sample per week per zip.

Ad Server count 504 may include: Total impressions. Potentially, unique impressions should match total impressions.

Tag Counts 508 may include: Total number of tags delivered should match total impressions.

Zip to DMA (or other region translation table) 510 may include: Translation of zips to DMA (or region specifically for advertiser's defined model. Clients may use a "custom" region, which means zips may need to be translated into regions.

Survey data is primary consumer response data continuously collected from a representative sample of all Internet users who are exposed to the campaign. The survey data will allow us to collect a perfectly representative sample of the total population exposed to the campaign thus allowing us to correct for panel bias. In this survey data we will collect zip code, basic demographics, computer usage and branding metrics (if the brand opts in for this analysis).

Panel data will be provided to Marketing Evolution via comScore. ComScore will report the impressions and unique machines reached in each market group (as defined by P&G) for each campaign week. Marketing Evolution then applies the exposure observations against the panel to project the delivery to the total U.S. population.

Ad server data is the total impressions delivered by week which provides the level which the panel and survey impressions need to be projected to.

We know from extensive experience that the comScore panel can be subject to skews relative to the U.S. online population. It is for this reason that we believe the survey calibration is critical.

Step 1: Online Agency Traffics Online Campaign with Survey Tracking Tags

Marketing Evolution will work with your Online trafficking agency or the publishers (if your ads are not being trafficked by an agency) to include the tracking pixels with all creative units running. Because of the extensive detail necessary in this process the inventive method requires a highly structured QA/training process and project managers that know where the points of risk occur.

Step 2: Campaign Measurement and QA

All three data streams are collected over the campaign period. The Online campaign is executed and tracked by the Consumer panel and by the surveys are collected from the population. Surveys are spawned from a random sample of the ads to collect the zip code, country location, multi-computer use, and other profile data.

In order to make the measurement a success the online agency will need to be tracking the creative units with a special tag. The implementation of this tag will require some basic training for the trafficking team at the agency and a QA process executed by Marketing Evolution. When the agency sends the redirect tags to the individual sites they will also copy Marketing Evolution so we can ensure the ads have been trafficked properly to include the tracking tag.

Step 3: Data Pull

The panel data stream will be pulled by the Consumer Panel in the form of total impressions and unique impressions by market by week. The survey data is analyzed to create the calibration metrics for international delivery, zip code distribution, and the demographic profile. The data is aggregated to market groups and each market group is identified to be a specific percentage of the sample.

Step 4: Marketing Evolution Calibration

If significant differences are found in regional distribution between the panel data stream and the survey data stream, the panel data stream will be weighted to match the survey data stream. The survey data provides the most representative stream is a sample of the population. The equation used for weighting the Consumer Panel to the survey data is:

Regional Weight=(% of the total within Survey Data)/(% of Total within Consumer Panel)

This calibration phase will also provide the capability to convert GRP's to TRP's and identify the percentage of impressions delivered out of the United States.

Step 5: Client Delivery

The data format requested is customized to the clients requested regional and week definitions. The regional groups are created using zip code categories.

Figure 15:
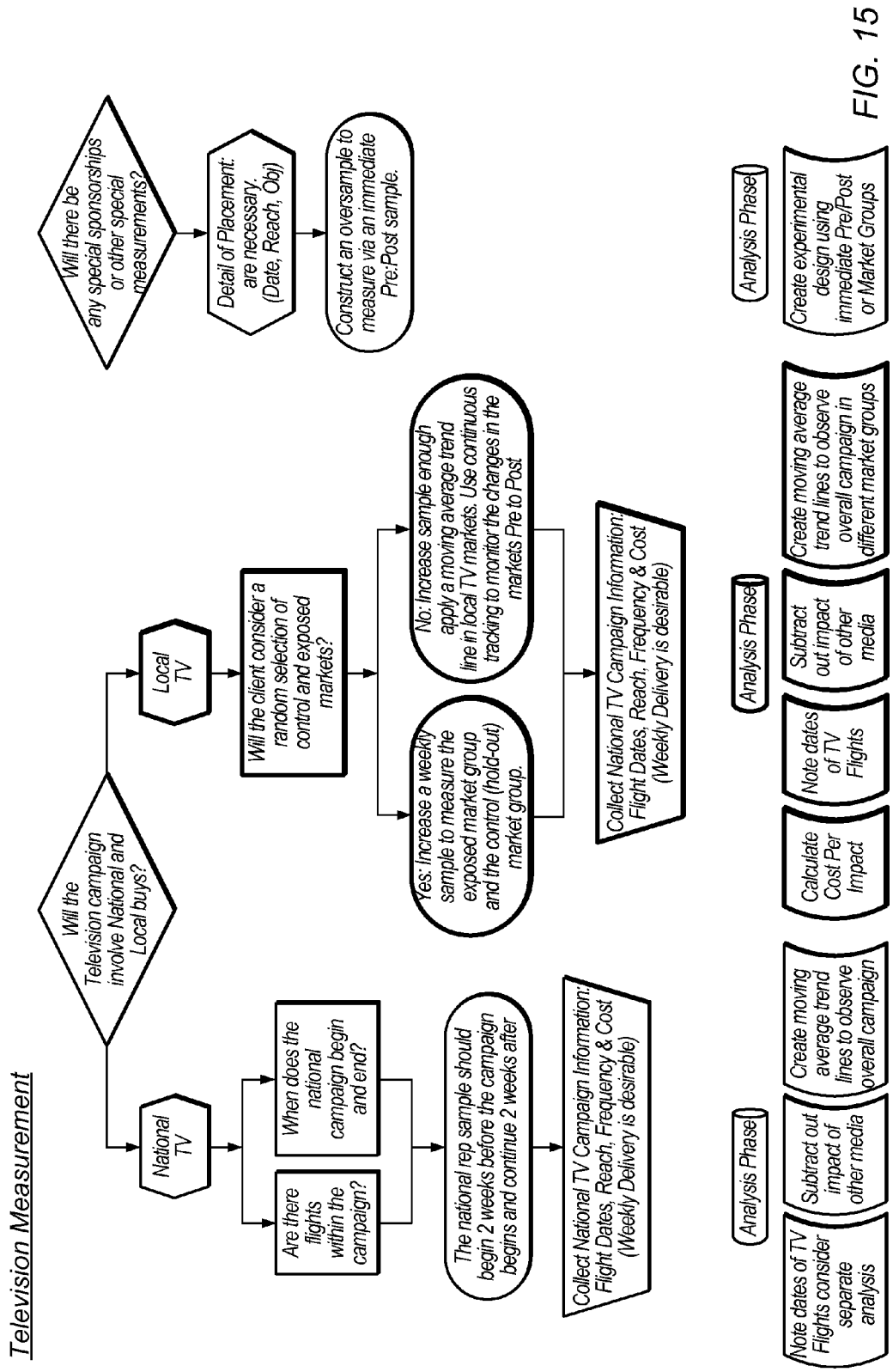
FIG. 15 is a flow chart depicting how the inventive method isolates the effects of a television campaign.
Figure 16:
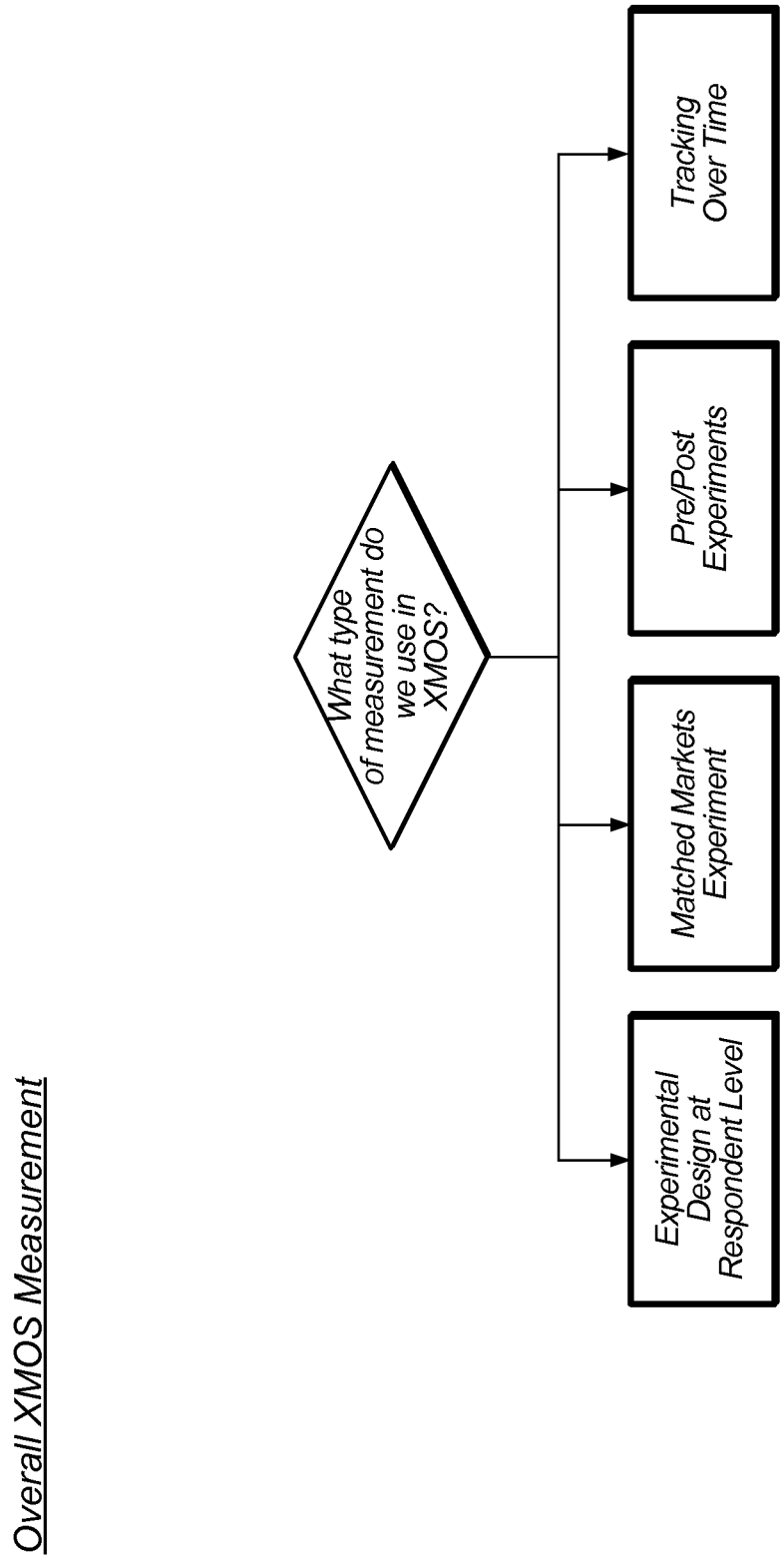
FIG. 16 is a flow chart depicting the overall types of measurements used in accordance with the inventive method.
Figure 17:
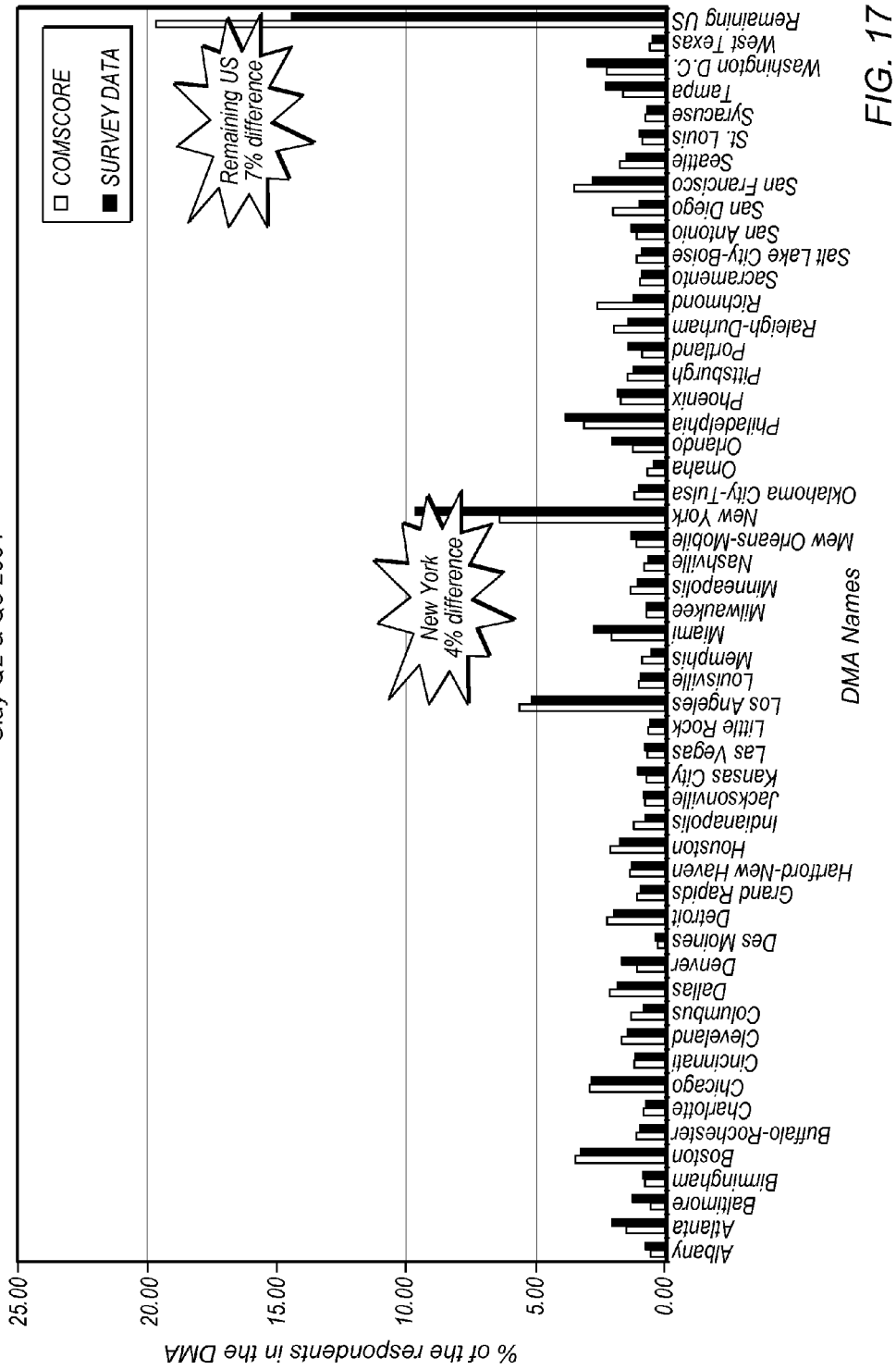
FIG. 17 is a comparison of consumer panel data to survey reported data collected directly from a campaign.
Figure 18:
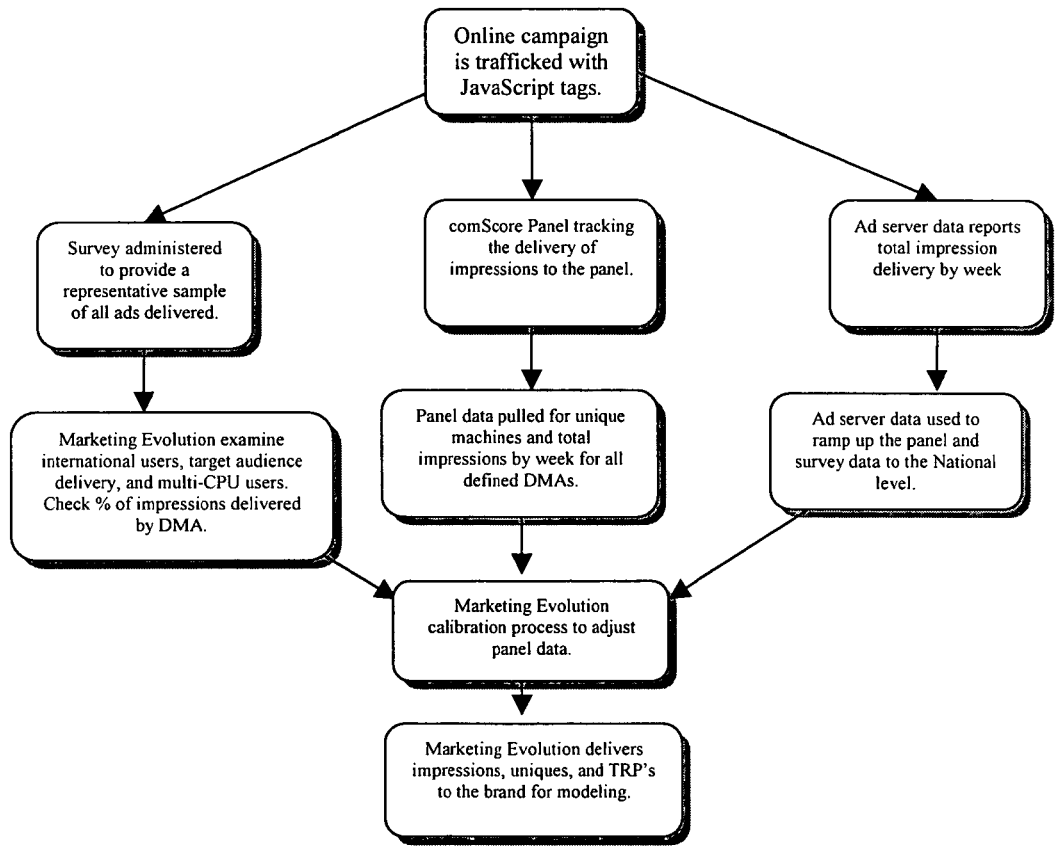
FIG. 18 is a flow chart depicting survey data, panel data, and ad server data being processed to achieve accurate online impression delivery data.

FIG. 15 depicts an analysis of a television campaign and is described below.

Television Measurement

Will the television campaign involve National and Local buys?

1. National TV
   a. Are there flights within the campaign?
   b. When does the national campaign begin and end?
   c. The national rep sample should begin 2 weeks before the campaign begins and continue 2 weeks after.
   d. Collect National Television Campaign information: Flight date, Reach, Frequency, & Cost (weekly delivery is desirable).
   e. Analysis Phase (National TV)
      i. Calculate CPI a. $TV_{Nat} = \dfrac{C_{TV}}{V_I}$ b. Where,
      i. $TV_{Nat}$=Cost for National Television Campaign
      ii. $V_I$=Volume impacted by media
   ii. Note dates of TV flights consider separate analysis.
   iii. Subtract out impact of other media Television=$[\Delta_{FTV} - \epsilon_M - \epsilon_R - \epsilon_O \epsilon_{NP}] = \epsilon_{TV}$ Where,
      $\epsilon_{TV}$=The overall effectiveness of television advertising
      $\Delta_{FTV}$=Point Difference per Flight
      $\epsilon_M$=The overall effectiveness of magazine advertising
      $\epsilon_R$=The overall effectiveness of radio advertising
      $\epsilon_{NP}$=The overall effectiveness of newspaper advertising
      $\epsilon_O$=The overall effectiveness of online advertising
   iv. Create moving average trend lines to observe overall campaign in different market groups.

a. $y = mx + b$ b. $\dfrac{\sum (\%TT)(n_i)}{N_T}$ = Moving Average

Where,
      $n_i$=Sample size per day for top two
      $N_T$=Total sample size for (n) day period
      % TT=% of top two box by day.

2. Local TV
   a. Will the client consider a random selection of control & exposed markets?
      i. Yes: Increase weekly sample to measure the exposed market group and the control market group.
      ii. No: Increase sample enough to apply a moving average trend line in local TV markets. Use continuous tracking to monitor the changes in the markets Pre to Post.
   b. Collect National Television Campaign information: Flight date, Reach, Frequency, & Cost (weekly delivery is desirable).
   c. Analysis Phase (Local TV)
      i. Calculate CPI a. $TV_{Local} = \dfrac{C_{TV}}{V_I}$ b. Where,
      i. $TV_{Local}$=Cost for Local Television Campaign
      ii. $V_I$=Volume impacted by media
   ii.
   iii. Note dates of TV flights consider separate analysis.
   iv. Subtract out impact of other media $$\text{Television (Local)} = \dfrac{C_{TV}}{R_{TV_{Local}}[w_i d_i (E_{TV} - C_{TV})]P_t} = \varepsilon_{TV_{Local}}$$

Where,
$\epsilon_O$=The overall effectiveness of Local Television advertising on the campaign.
$C_{TV}$=Control group for Online.
$E_{TV}$=Exposed group for Online.

$$R_{TV_{Local}} = \text{Reach} = \left[\dfrac{\left(\dfrac{N_{IMP}}{\bar{x}_{Freq}}\right)P_{QT}}{N_{TP}}\right]$$

or Agency will provide 'Reach.'
Where,
   $N_{IMP}$=# of Impressions
   $\bar{x}_{Freq}$=Average Frequency
   $P_{QT}$=Percent Qualified for Target
   $N_{TP}$=Sample size for the "Target Population."
g. Calculate the effect among different groups $$t = \dfrac{(\bar{x}_E - \bar{x}_C)}{\sqrt{\left(\dfrac{s_E + s_C}{n_E + n_C - 2}\right)\left(\dfrac{1}{n_E} + \dfrac{1}{n_C}\right)}}$$

($\bar{x}_E$—Mean of Exposed group, $\bar{x}_C$—Mean of Control group)
$s_E$=Standard deviation of Exposed group, $s_C$=Standard deviation of Control. group.
$n_E$=Sample size for exposed group, $n_C$=sample size for control group.

v. $F = \dfrac{MS_B}{MS_W}$ ($MS_B$—Mean Square Between Groups, $MS_W$—Mean Square Within Groups) Create moving average trend lines to observe overall campaign in different market groups.

a. $y = mx + b$ b. $\dfrac{\sum (\%TT)(n_i)}{N_T}$ = Moving Average

Where,
   $n_i$=Sample size per day for top two
   $N_T$=Total sample size for (n) day period
   % TT=% of top two box by day.
3. Will there be any special sponsorship or other special measurements?
   a. Detail of Placement are necessary (Date, Reach, Obj).
   b. Construct an oversample to measure via an immediate Pre/Post sample.
   c. Analysis Phase
   Create experimental design using immediate pre/post or Market groups.

$$t = \dfrac{(\bar{x}_E - \bar{x}_C)}{\sqrt{\left(\dfrac{s_E + s_C}{n_E + n_C - 2}\right)\left(\dfrac{1}{n_E} + \dfrac{1}{n_C}\right)}}$$

($\bar{x}_E$—Mean of Exposed group, $\bar{x}_C$—Mean of Control group)
$s_E$=Standard deviation of Exposed group, $s_C$=Standard deviation of Control. group.
$n_E$=Sample size for exposed group, $n_C$=sample size for control group.

$$F = \dfrac{MS_B}{MS_W}$$

($MS_B$—Mean Square Between Groups, $MS_W$—Mean Square Within Groups)
Step 3: Examine Complementary Effects and Synergies
The complementary effects analysis is accomplished by looking at different cells in the experimental design. As shown in FIG. 3, different combinations of the experimental design cells can be used to derive population based effects. Population effects can be indexed against the population spend level to perform the ROMO analysis.
Step 4: Perform a Dollar-For-Dollar Comparison (ROMO Calculation) of the Each Media
Based on the above population analysis, the return on marketing objective provides a relative cost per effect of each media. The calculation is as follows:

Number of people affected (i.e., Volume Impacted)
=Impact*Reach*Target Audience Population     (1)

$$\text{Cost per effect} = \text{Dollar cost of media/number of people affected} \tag{2}$$

$$\text{Cost Efficiency Index} = (\text{Cost Per Impact/Lowest Cost Per Impact}) * 100 \tag{3}$$

Comparing the cost per effect of each media tells the marketer which media is most cost efficient at achieving their objective, and therefore which media should play a larger role in the mix and which should be trimmed.

Step 5: Recommend Budget Re-Allocations if Applicable

FIG. 5D illustrates a sample analysis. In this Figure, online and magazines are cost efficient elements of the marketing mix, and increasing online's share of the budget is justified.

The inventive analysis could stop at the ROMO calculation and recommend budget shifts based on these findings, however, such recommendations would only indicate which direction to shift spending, and not provide much descriptive guidance in terms of how much to shift and what other issues to take into consideration. Therefore, the inventive method has another level of analysis. Step six describes this additional layer to the analysis. In this descriptive analysis, each media is now looked at separately to better understand specific dynamics such as the generalizability of results, frequency, decay rate, and so forth.

Verifying Advertising Exposure

As stated earlier, a key reason for conducting XMOS cross-media studies via the Internet is to ensure proper experimental design blocking for Online and large sample size to enable factorial experimental design across other media. Today's Internet advertising budgets are not large enough to generate the audience reach attained by the more generously-funded TV and print media, for example. As a result, using a data collection technique like the telephone does not make sense from an economic perspective since a typical Internet schedule might reach between 2%-8% of the population. More significantly, any type of interview recruitment that did not also integrate a true experimental design would produce inaccurate data skewed by usage bias. Even if exposure to online advertising could be accurately gauged (and without cookies this is a dubious proposition), low incidence would make the research cost-prohibitive and the lack of experimental design would make the data inaccurate.

Web-based surveys alone do not solve the problem. ICM Web-based surveys can be used to identify people who have been exposed to Internet advertising but without the use of a factorial experimental design these studies not only incorrectly report the effects of Online advertising, they may fall short in verifying the effects of offline media. It may be assumed, for example, that 100% of respondents determined to be Internet-exposed had an opportunity to see (OTS) an online advertisement since they are electronically identified via cookie tracking (See FIG. 6), but who should these respondents be compared to? The practice of comparing them to "not exposed" respondents is flawed because it confounds Internet usage patterns with effect. Only an experimental design, or the application of a "decontamination procedure" can fix this problem. But more significant than the online exposure measurement inherent in ICM measurement is the fact that such studies do not experimentally control for offline media. Instead, they simply use a recall method to collect advertising exposure to other media.

The present invention differentiates itself from ICM measurement by using the survey data only as a secondary level of analysis to provide descriptive guidance to the marketer—the "step six" of the analysis (which classifies OTS by respondent) only occurs after conclusion of relative effect and suggested mix have been arrived at through the use of an analysis of the factorial design at the total population cell level of aggregation. Therefore, the primary analysis of the inventive method is based on the use of the factorial design applied to populations of respondents, and only after this analysis, as a "next step" is the survey data used. The ICM method of estimating ad exposure leaves open the possibility that some respondents may be incorrectly classified as having seen a TV ad when they actually did not, or as having not seen an ad when they actually did. It also creates a disparity in ad exposure verification when compared to Internet ad exposure. This isn't a criticism of the recall technique and a call for consistency when measuring the individual effects of the Internet, TV and magazines in a cross-media study. The invention ensures consistency by using a "leveling" procedure to remove the potential for bias. The leveling procedure uses the dollars invested in each media and the observed total population effects as measured in the factorial experimental design. This leveling procedure is the ROMO analysis described in step 4. It leads directly to the recommendation of marketing mix changes as noted in step 5.

In ICM &CMM studies, which lack the ROMO analysis leveling procedure, it is difficult to estimate the error caused by ad exposure verification disparity for these ICM &CMM studies, but it should be recognized as a potential overstatement bias, perhaps in favor of Internet advertising effect relative to offline media. The inventive method has no such bias in favor of online media.

Television Frequency Estimates can Lead to Undervalued Impact at High Frequencies Frequency of ad exposure is a key determinant in brand metrics. Some hypothesize that the more ads people are exposed to, the more they absorb the intended message. Empirical research has shown that the absorption is convex linear, meaning that at a certain point, diminishing returns limit the incremental value of additional advertising impression. So, for ICM &CMM research, a vital prerequisite to the budget reallocation projection is the ability to accurately capture advertising frequency for individual media, in order to observe effects at varying levels of exposure. By contrast, the inventive method takes into account that the measurement of the campaign is "real-world" and therefore the effectiveness and the ROMO analysis reflect the average frequency of the campaign at any specific point in time. This analysis is based on a continuous tracking approach.

Some ICM &CMM research uses ad frequency estimates as the cornerstone for projecting Internet advertising effects at higher Internet spend (and therefore higher frequency) levels. Conversely, this reallocation of dollars to the web is counterbalanced by reduced offline spend, resulting in lower offline ad frequency. And, estimates of the relationship between offline frequencies and ad effectiveness are incorporated into the offline projections at the reduced spend levels. However, in ICM &CMM research, there are differences in the way frequency is estimated for each medium. In this type of research, Internet and print frequency estimates are more precise than estimates of TV frequency, and this may impact the ability to accurately tie frequency estimates with advertising effectiveness measures. This is why the inventive analysis does not confound what should rightly be termed "descriptive analysis" of respondent level frequency with effectiveness analysis. It should be understood that the invention performs the effectiveness analysis without any use of the respondent level frequency analysis discussed in this section.

Conventionally, for print, interviewees are shown the covers of magazines and they identify which issues they have read. Based on the number of issues read and the number of ad insertions that were booked, each interviewee's print frequency is ascertained. For television, one of three are applied: Respondents are asked a series of questions relating to hours of television viewing by day part and program. Based on the respondents' answers to the TV questions, each respondent is assigned to a TV Quintile from heavy to light. Alternatively, the invention uses behavioral TV tuning data from technologies such as a television set-top box to produce individual household and respondent exposure probabilities, which can be calibrated with self-reported behavior. According to the GRPs delivered to date, the respondents are assigned a TV frequency that corresponds with the particular TV Quintile to which they were designated.

For the Internet, frequency is established from the cookie history of the respondent. The cookie electronically captures each ad exposure, and this cookie data directly relates the Internet frequency of the respondent.

The precision of the data for each medium varies, and a mathematical discrepancy exists as well. The Internet and print frequencies are continuous on any given day. Any respondent has the possibility of being assigned a frequency value from zero to the total number of ads that have been delivered to date. If 25 total ads had been delivered either in magazines or online then a respondent could theoretically be assigned a frequency value of any integer between 0 and 25 (0, 1, 2, 3, 4, 5, or 25). By contrast, the TV frequencies are discrete on any given day. Any respondent only has the possibility of being assigned a frequency value of 0 or a value that correlates to one of the five quintile averages for that day. If 25 total ads had been delivered on television then a respondent might theoretically be assigned a frequency value of either 15.1 (Heavy TV), 8.7 (Heavy-Medium TV), 6.3 (Medium TV), 4.4 (Medium-Light TV), 1.5 (Light TV), or 0 (no TV).

Discrete, or bucketed, frequency measurements for TV may result in a loss of accuracy in capturing the relationship between brand lifts and frequency. The way that TV frequency is estimated potentially overstates the impact of a small number of TV exposures and understates the impact of a larger number of TV exposures. This will occur because the range of frequencies tends to be smaller in the lower quintiles than in the upper quintiles. In the lower quintiles, the average frequency will be closer to the actual frequency of a respondent. On the other hand, the upper quintile averages have the potential to diverge further from the actual frequency of the respondent.

Figure 7:
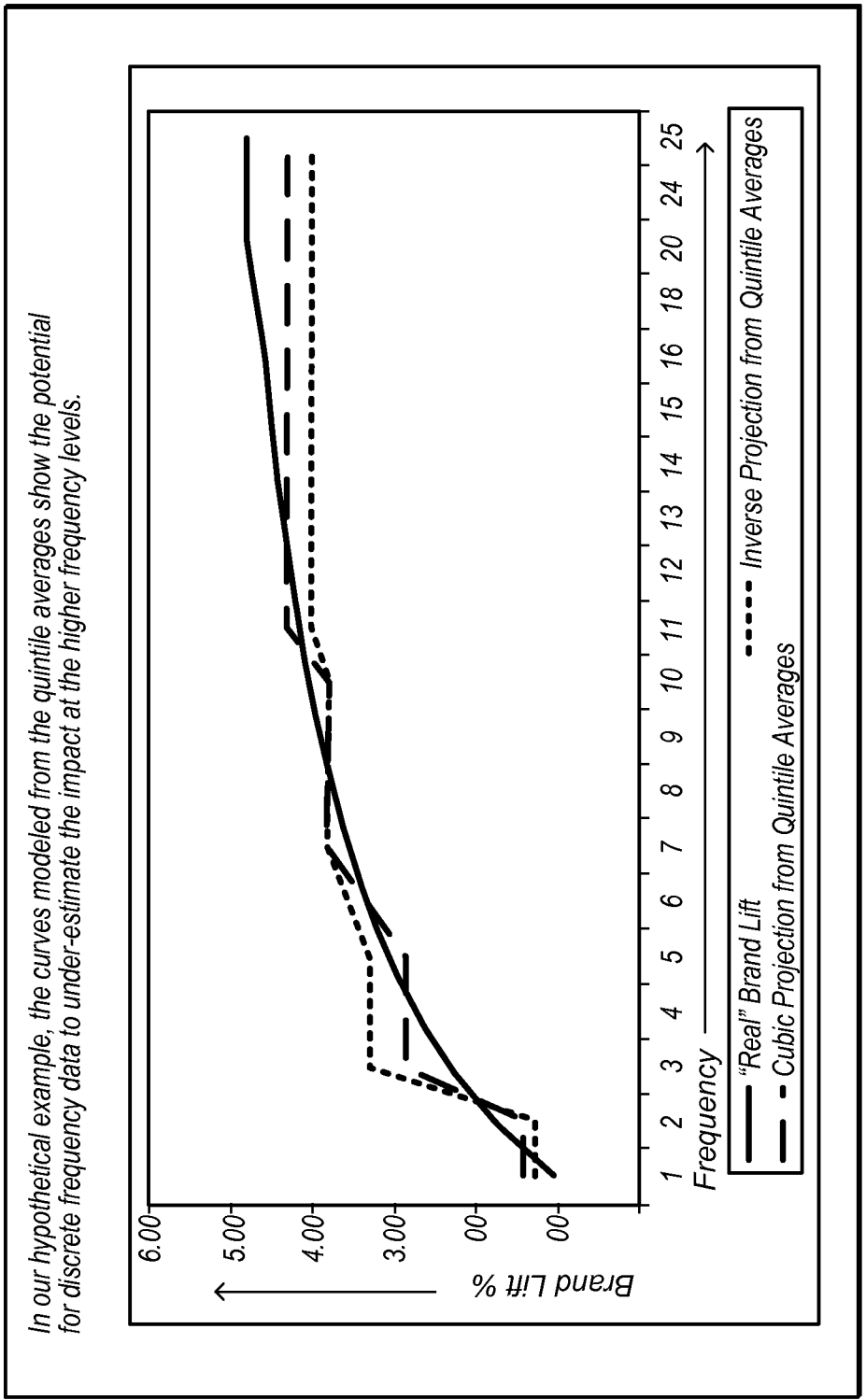
FIG. 7 is a graph showing modeling brand lifts from average quintile frequencies.
Figure 8:
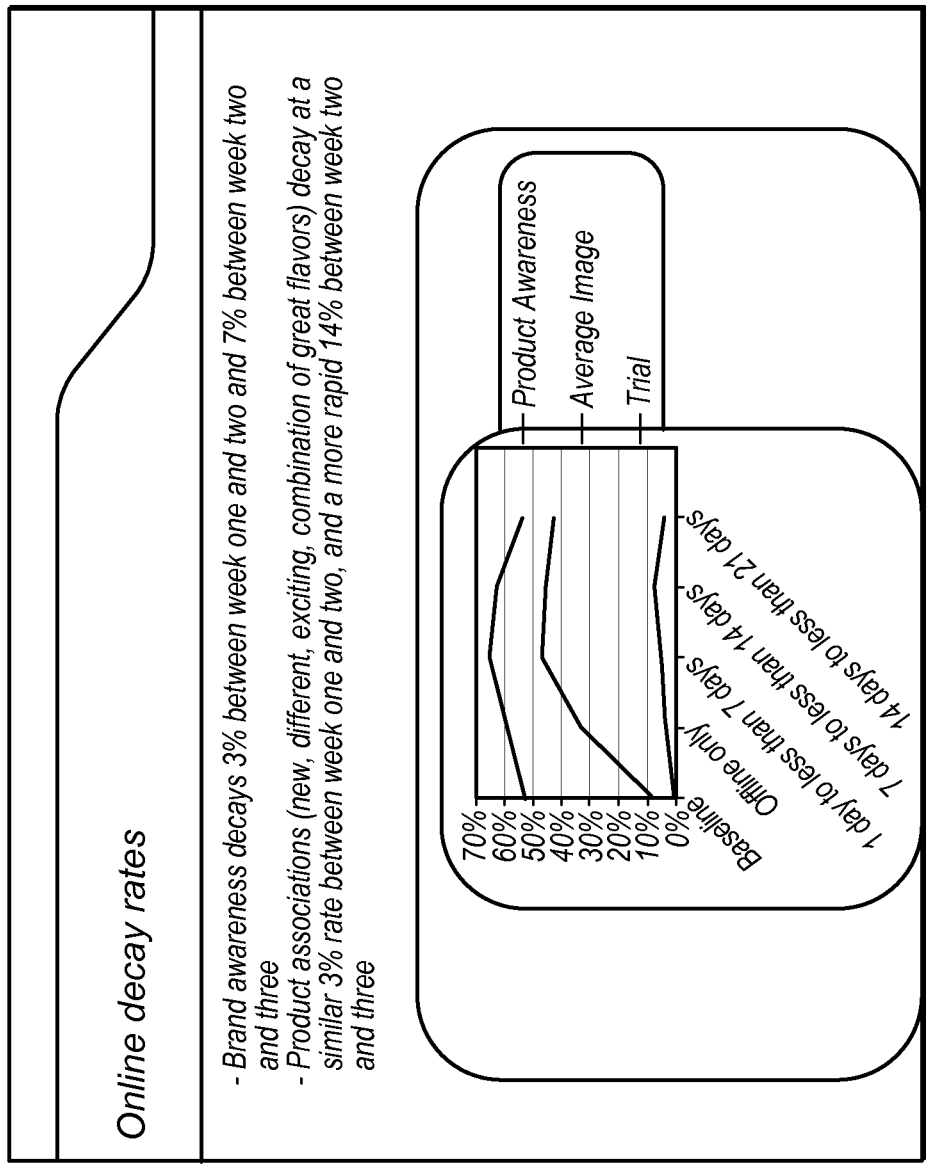
FIG. 8 is a graph showing online decay rates as determined under the inventive method.
Figure 9:
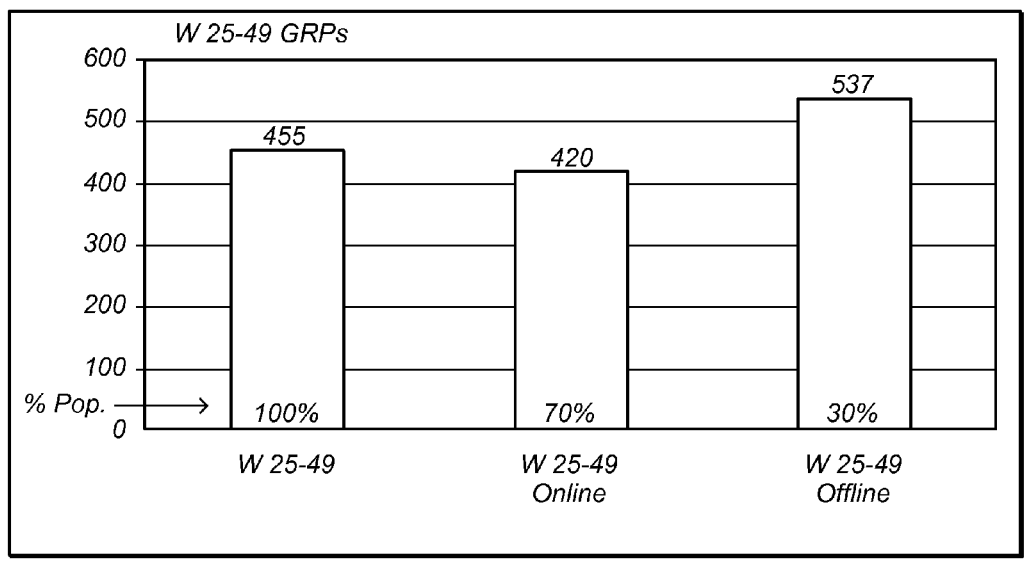
FIG. 9 is a graph showing disparate media delivery weights to online and offline populations.
Figure 10:
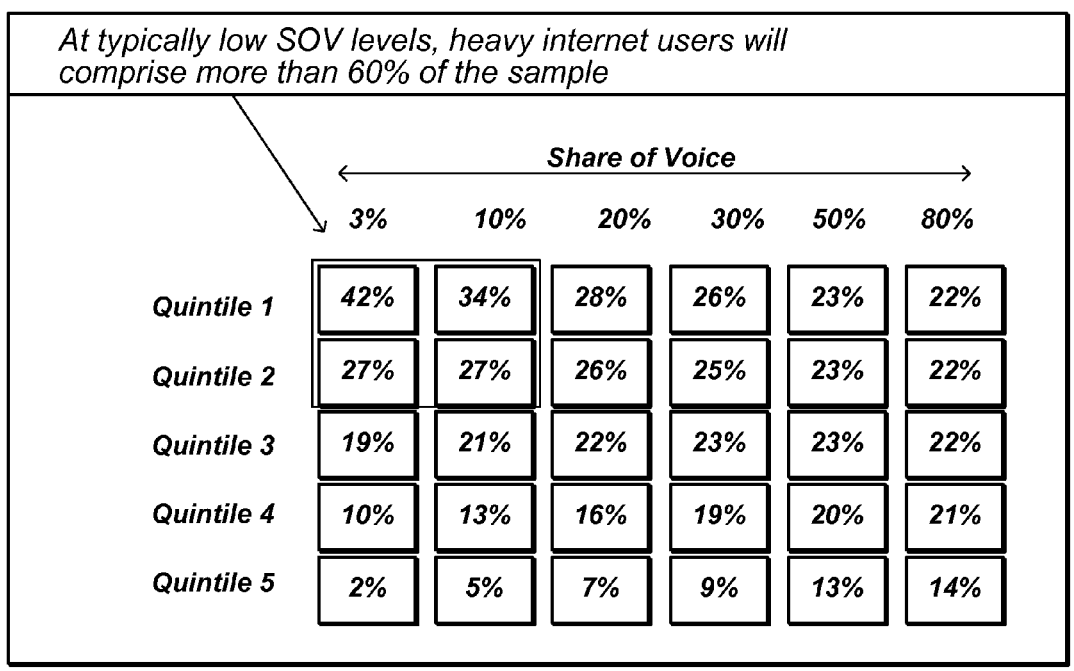
FIG. 10 is a graph showing that online surveys typically collect the heaviest online users.

FIG. 7 depicts the data from a simulation that illustrates this potential effect. A data set was built containing 100 hypothetical TV viewers and placed them in five quintiles. Guided by the quintile breaks from an advertiser's actual television campaign, a "real" frequency was assigned to each hypothetical TV viewer. Then, based on the general shape of branding curves, a brand lift value was assigned to each hypothetical viewer. Curves were modeled to predict the brand lift from the quintile averages. When the modeled curves were plotted against the brand lift curves that resulted form the "real" frequency, the fits were excellent (>0.90 adjusted $r^2$). Despite these great statistical fits, the curves over-estimated the impact at the lower frequencies and flattened out very quickly at the higher frequencies (See FIG. 6). In this example, modeling from a quintile average undervalues the impact of TV. The modeled curve would indicate to the researcher that the TV impact begins to diminish before it actually does. And, since the inflection points on the diminishing return curves help the researcher identify where a particular medium reaches its maximum potential, it would have led the researcher to underestimate the dollar amount that should be allocated to TV.

In the inventive method, any descriptive analysis of frequency, creative differences, recency and so forth are reserved until after a proper factorial based population analysis of independent effects, complementary effects, and ROMO calculations have been completed. Survey based questions are used for descriptive analysis but not for effectiveness analysis or media re-allocation recommendations.

Step 6: Provide Descriptive Advertising and Media Suggestions

Descriptive analysis is intended to provide the marketer with finer tuned recommendations than the experimental design and ROMO calculations allow. The descriptive analyses are set apart in the inventive analysis because they require additional analysis, application of statistical procedures and algorithms. They are useful descriptive enhancers to the overall analysis, but unlike basic ICM &CMM, these descriptive elements are NEVER used to declare the effectiveness of one media versus the next or to determine cost-efficiency or reallocation findings. These more critical findings instead are based on the rigorous factorial experimental design and continuous tracking on a cell population basis rather than the respondent level descriptive analysis level.

Differences have been described above in exposure (OTS) measurement across media in basic ICM &CMM studies. The inventive method uses the respondent level OTS information purely for descriptive analysis after the measurement of effectiveness and cost-efficiency has been calculated, while basic ICM &CMM studies use the OTS information as part of the main analysis of effect. These differences affect the precision to which respondents may be put into different cells for media exposure. There are other differences that may also affect the ability to gauge individual media effectiveness in an equitable way and the validity of generalizing research outside of the campaign being measured. These differences relate to isolating individual media effects to recency of exposure and to creative effects.

Advertising effects decay over time. The amount of decay can be influenced by a variety of factors. However, it is well established that the time since last exposure to an advertisement is inversely related to the effects of that advertisement. Because of the differences in measurement of vehicle and advertising exposure across media in ICM, we must assume that, at the time of surveying, there will be differences in the recency of exposure across different media channels.

With the inventive method, the decay rate is preferably directly measured and applied to the analysis to make it a level playing field for all media. The invention applies a time based ID to the ad delivery and the survey completion. This time based ID is used to measure the time since last exposure. By using a random sampling survey or panel which is not tied to the online ad campaign, the average time since last exposure can be measured and applied to the whole sample to properly account for decay.

The invention includes an extra sample source to ensure that those exposed to the campaign were not immediately exposed a moment before the survey, basic ICM studies generally make no such adjustment. It was stated earlier that conducting surveys online is a necessity for detecting online ad effects relative to other well-budgeted media like TV and print. Without the addition of the delayed sample, the basic ICM approach, however, may advantage the Internet when capturing ad effects. Since the online surveying procedure is incorporated into the online campaign ad serving process in basic ICM studies, there is a greater likelihood that web effects would be collected within closer proximity to ad exposure than with offline media. For example, online advertising research often relies on pop-up recruitment that is spawned from the campaign creative, launched when respondents leave the page that the online advertising appears on. This allows the researcher to effectively recruit respondents exposed to the particular online advertisement being measured. While recruitment is also conducted through the rotation of recruitment media independent of the advertising campaign, there is often a high proportion of online exposed respondents who are recruited very closely to last exposure. While the invention explicitly factors this into the analysis, ICM studies do not. This phenomenon of decay weighting also effects website event other immediate measured elements of the mix. The invention applies the adjustment to each media to ensure a level playing field to all media.

Early research on the effect of recency was conducted by Rex Briggs and Scott McDonald in a 1997 IAB advertising effectiveness study. The research found that the decay curve of online was similar to that of television. The analysis of recency continues with the invention as a key aspect of the descriptive analysis. Different variable decay at different rates depending on the media. If a steep decay curve is observed with online, the inventive method then calculates the average population decay in the campaign and weights the online data so that it reflect the population decay therefore systematically adjusting for any recency bias (see FIG. 8).

The quality of advertising creative is a crucial determinant in advertising success. For that reason, results from cross-media research that measures and compares effectiveness across media channels is certainly affected by the quality of the advertising running in those channels.

Consequently, there will be differences in creative quality among channels that will manifest in the measurement of comparative success. For example, breakthrough TV will likely eclipse Internet creative and will make the television seem more successful than the Internet in terms of overall effectiveness. Conversely, Internet advertising that supports the breakthrough TV creative may bolster the web's impact. Without recognizing this very important factor of creative quality, this type of research can provide results that are not necessarily representative of the general strength or weakness of the media themselves. The inventive analysis is reported as case studies, which, by definition, represent the effect of each case as opposed to general rules of media effectiveness.

Creative size, and for online advertising, creative technology, may also be a factor. A two-page, full-color spread in a magazine has been shown to have more value than a ⅓ page, two color one. For online advertising, the alternatives are numerous; executions can range from a rotating banner advertisement to an intrusive, rich media video creative. These differences certainly have an impact on the relative success of each medium for each campaign tested. The inventive method's step 6 descriptive analysis enables the analysis of creative differences for Online, and in some cases, also enables examination of creative difference in magazines (if the marketer opts to use selective binding) and TV, if the marketer is willing to use spot market ad buys to vary creative.

One of the questions that advertisers would hope to answer from cross-media research is what happens when the Internet portion of the advertising budget is significantly increased. According to estimates, the Internet typically receives about 2% of the total advertising budget. Some recent cross-media studies have suggested that these Internet budgets should be raised by substantial amounts—in some instances by 4 or 5 times current levels—in order to achieve the best possible branding effect.

While the suggestions appear to be reasonable based on the collected data, caution should be used when employing a model to predict events that occur far outside the range of the data that was used to build that model. Studies conducted under the inventive method specifically address the scaling issue in two ways. First, online can be scaled within the current media plan by first examining the websites that the marketer used for the main ad buy. To the extent that the marketer was only purchasing a percentage of the site, the branding effects can be scaled in direct linear fashion until the inventory is exhausted. Second, marketers are encouraged to broaden their online ad buy to include websites that would be the "next" set of properties they would buy if they had additional budget. Since "fractional ownership" of online properties is possible, marketers can buy modest amounts of inventory in these "next" websites that are just large enough for research only. Scaling these websites with observed effectiveness data is also a linear calculation. Basic ICM &CMM studies that do not take care in ensuring scaling can be problematic. Scaling in TV, using set-top box or self reported questions magazines using cover recall, etc., and allow for recommendations to increase other media.

In sum, the invention includes several significant advances over previous advertising measurement in an effort to address cross-media measurement in the most accurate manor possible.

Having described the invention with reference to specific embodiments and the appended figures, it is to be understood that the invention is not limited to the specific embodiments or drawings so described. Rather, the scope of the invention is defined by the claims appearing hereinbelow and includes equivalents thereof.

What is claimed is:

1. A method of determining effectiveness of an advertising campaign including online advertisements, comprising:
    obtaining, by a computer system, online impressions data for one or more advertisements delivered online, wherein at least a portion of the online impressions data is obtained from delivery of online impressions to a consumer panel;
    obtaining, by the computer system, survey data from one or more consumers of the one or more advertisements delivered online; and
    determining, by the computer system, based on at least a portion of the online impressions data and at least a portion of the survey data, one or more quantitative measures of reach and frequency for the campaign.

2. The method of claim 1, further comprising performing marketing mix analysis based at least in part on the determined quantitative measures of reach and frequency.

3. The method of claim 1, wherein determining the one or more quantitative measures comprises performing a calibration to adjust consumer panel data based, at least in part, on at least a portion of the survey data.

4. The method of claim 1, wherein the consumer panel data is adjusted at least in part to correct bias in the consumer panel data.

5. The method of claim 1, wherein performing a calibration to adjust consumer panel data comprises weighting a stream of consumer panel data to match a stream of survey data.

6. The method of claim 1, wherein the consumer panel data is adjusted based at least in part based on information on a region of one or more consumers receiving at least one of the advertisements.

7. The method of claim 1, wherein the consumer panel data is adjusted at least in part to account for one or more consumers outside the country of the consumer panel.

8. The method of claim 1, wherein the consumer panel data is adjusted based at least in part based on information on demographics of one or more consumers receiving at least one of the advertisements.

9. The method of claim 1, wherein at least a portion of the online impressions data is obtained from delivery of online impressions to a consumer panel, wherein at least a portion of the online impressions data is broken down by periodic intervals.

10. The method of claim 1, wherein the survey data comprises a representative sample of the one or more advertisements delivered online.

11. The method of claim 1, wherein the survey data comprises tracking information derived from one or more tracking tags included with at least one of the online advertisements.

12. The method of claim 1, wherein at least one of the quantitative measures of reach and frequency comprises an amount of gross ratings points.

13. The method of claim 1, wherein at least one of the quantitative measures of reach and frequency comprises an amount of target ratings points.

14. The method of claim 1, wherein the one or more quantitative measures of reach and frequency comprise two or more quantitative measures broken down by geographic region.

15. The method of claim 1, further comprising translating data by one or more zip codes into data by one or more designated market areas.

16. The method of claim 1, further comprising determining at least one value of target rating points from a value of gross rating points.

17. The method of claim 1, further comprising obtaining, by a computer system, ad server data, wherein the ad server data provides a level for projecting panel and survey impressions.

18. The method of claim 17, wherein the ad server data comprises total impressions delivered by periodic intervals.

19. The method of claim 1, wherein obtaining online impressions data comprises delivering, by a computer system, one or more online advertisements over a computer network.

20. A method of determining effectiveness of an advertising campaign including online advertisements, comprising:
obtaining, by a computer system, online impressions data for one or more advertisements delivered online, wherein at least a portion of the online impressions data is obtained from delivery of online impressions to a consumer panel;
collecting, over a network, data identifying a region or location for one or more of the consumers of the one or more advertisements delivered online, wherein the data identifying a region or location for one or more consumers is based, at least in part, on information provided by a user; and
determining, by the computer system, based on at least a portion of online impressions data and the data collected over the network comprising the region or location for at least one consumer, one or more quantitative measures of reach and frequency for the campaign.

21. The method of claim 20, further comprising performing marketing mix analysis based at least in part on the determined quantitative measures of reach and frequency.

22. The method of claim 20, wherein the data identifying a region or location for one or more of consumers of the one or more advertisements delivered online comprises collecting a zip code for one or more consumers.

23. The method of claim 20, wherein determining the one or more quantitative measures of reach and frequency for the campaign comprises combining collected data identifying a region or location for one or more of consumers of the one or more advertisements delivered online with survey data.

24. The method of claim 20, wherein determining the one or more quantitative measures comprises performing a calibration to adjust consumer panel data based, at least in part, on data provided by a user identifying a region or location.

25. The method of claim 24, wherein the consumer panel data is adjusted at least in part to correct bias in the consumer panel data.

26. The method of claim 24, wherein the consumer panel data is adjusted based at least in part based on information on a region of one or more consumers receiving at least one of the advertisements.

27. The method of claim 24, wherein the consumer panel data is adjusted at least in part to account for one or more consumers outside the country of the consumer panel.

28. The method of claim 20, wherein the data identifying the region or location for one or more of the consumers is based on tracking information derived from one or more tracking tags included with at least one of the online advertisements.

29. The method of claim 20, wherein at least one of the quantitative measures of reach and frequency comprises an amount of gross ratings points.

30. The method of claim 20, wherein the one or more quantitative measures of reach and frequency comprise two or more quantitative measures broken down by geographic region.

31. The method of claim 20, further comprising translating data for one or more zip codes into data for one or more designated market areas.

* * * * *